(12) United States Patent
Tatsuwaki et al.

(10) Patent No.: US 11,691,495 B2
(45) Date of Patent: Jul. 4, 2023

(54) VEHICLE EQUIPPED WITH BATTERY PACK

(71) Applicant: Honda Motor Co., Ltd., Tokyo (JP)

(72) Inventors: Masaaki Tatsuwaki, Saitama (JP); Ken Yasui, Saitama (JP); Satoru Kawabe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 112 days.

(21) Appl. No.: 17/512,616

(22) Filed: Oct. 27, 2021

(65) Prior Publication Data

US 2022/0153111 A1 May 19, 2022

(30) Foreign Application Priority Data

Nov. 19, 2020 (JP) ................................. 2020-192561

(51) Int. Cl.
*B60K 1/04* (2019.01)
*H01M 50/298* (2021.01)

(52) U.S. Cl.
CPC ............. *B60K 1/04* (2013.01); *H01M 50/298* (2021.01); *B60K 2001/0438* (2013.01)

(58) Field of Classification Search
CPC .......... B60K 1/04; B60K 2001/0438; H01M 50/298
See application file for complete search history.

(56) References Cited

U.S. PATENT DOCUMENTS

| | | | |
|---|---|---|---|
| 2013/0241240 A1* | 9/2013 | Tokumoto | B62D 25/08 296/193.08 |
| 2016/0236714 A1* | 8/2016 | Tatsuwaki | B62D 25/2045 |
| 2016/0236718 A1* | 8/2016 | Tatsuwaki | B60R 19/34 |
| 2017/0247057 A1* | 8/2017 | Tatsuwaki | B62D 27/065 |
| 2018/0236863 A1* | 8/2018 | Kawabe | B60K 1/04 |
| 2018/0269443 A1* | 9/2018 | Takahashi | H01M 50/262 |
| 2019/0047393 A1* | 2/2019 | Kato | B60K 1/04 |
| 2019/0047625 A1* | 2/2019 | Kato | B60G 3/18 |
| 2022/0144063 A1* | 5/2022 | Tatsuwaki | B60L 50/66 |
| 2022/0144064 A1* | 5/2022 | Tatsuwaki | B60K 1/04 |
| 2022/0258585 A1* | 8/2022 | Yaita | B60K 1/04 |

FOREIGN PATENT DOCUMENTS

WO   2013084935   6/2013

* cited by examiner

*Primary Examiner* — John D Walters
*Assistant Examiner* — James J Triggs
(74) *Attorney, Agent, or Firm* — JCIPRNET

(57) ABSTRACT

Provided is a vehicle equipped with a battery pack. A vehicle equipped with a battery pack includes a floor tunnel and a battery pack. The battery pack includes a first battery accessory, a second battery accessory, and an electrical wiring. The first battery accessory is arranged inside a front tunnel portion of the floor tunnel from below. The second battery accessory is arranged inside a rear tunnel portion of the floor tunnel from below. The electrical wiring extends in a front-rear direction of a vehicle body across right and left second floor cross members, and connects the first battery accessory and the second battery accessory.

20 Claims, 12 Drawing Sheets

VEHICLE EQUIPPED WITH BATTERY PACK

CROSS-REFERENCE TO RELATED APPLICATION

This application claims the priority benefit of Japan application serial no. 2020-192561, filed on Nov. 19, 2020. The entirety of the above-mentioned patent application is hereby incorporated by reference herein and made a part of this specification.

BACKGROUND

Technical Field

The disclosure relates to a vehicle equipped with a battery pack.

Related Art

As a vehicle equipped with a battery pack, for example, a vehicle has been known in which a floor cross member protrudes downward from a floor panel and extends in a vehicle width direction, and a battery pack is arranged below the floor panel. In the battery pack, a cover is recessed downward in order to avoid the floor cross member, and batteries are arranged in a manner of being staggered in a front-rear direction of a vehicle body with respect to the recessed recess (for example, see Patent literature 1).

LITERATURE OF RELATED ART

Patent Literature

[Patent literature 1] International Publication No. 2013/084935

However, in the vehicle equipped with a battery pack described in Patent literature 1, the batteries are arranged in a manner of being staggered in the front-rear direction of the vehicle body with respect to the recess of the cover. Moreover, because a battery accessory is also arranged at the rear, the battery accessory also expands in the vehicle width direction, and an arrangement range of the battery expands to the vicinity of a side sill. In order to prevent battery damage caused by a side collision, it is necessary to reinforce the side sill, and a weight of the vehicle body is increased, which is thus not preferable.

As a measure for securing a capacity of the battery, for example, it is conceivable to arrange the battery accessory of the battery pack or the like inside a floor tunnel that is raised upward from the floor panel. However, when the battery accessory or the like is arranged inside the floor tunnel, it is difficult to make the floor cross member continuous in the vehicle width direction in the floor tunnel.

Therefore, for example, when a load is input to the vehicle by a side collision, it is necessary to take measures to protect the battery, the battery accessory, and the like from the input load. As the measure, for example, it is conceivable to reinforce the side sill as described above or to increase a plate thickness of a side frame of the battery pack to secure rigidity and strength, but the weight of the vehicle body is increased, which is not preferable.

SUMMARY

According to an embodiment, the disclosure provides a vehicle equipped with a battery pack, which has a light vehicle body weight, can sufficiently secure a battery capacity, and can further protect a battery, a battery accessory, and the like from a load input by a side collision.

According to an embodiment, the disclosure proposes a vehicle equipped with a battery pack according to the disclosure includes: a floor cross member (for example, a second floor cross member 45 in the embodiment) that is raised upward from a floor panel (for example, a floor panel 23 in the embodiment) forming a floor portion of a vehicle (for example, a vehicle Ve equipped with a battery pack in the embodiment) and extends in a vehicle width direction; a floor tunnel (for example, a floor tunnel 24 in the embodiment) which intersects the floor cross member and extends in a front-rear direction of a vehicle body, and in which a front tunnel portion (a front tunnel portion 241 in the embodiment) in front of the floor cross member in the vehicle body is raised higher upward than a rear tunnel portion (for example, a rear tunnel portion 243 in the embodiment) at the rear of the vehicle body from the floor panel; and a battery pack (a battery pack 20 in the embodiment) including a battery module (a battery module 82 in the embodiment), which is arranged below the floor panel and below the floor cross member and the floor tunnel. The battery pack includes: a first battery accessory (for example, a first battery accessory 831 in the embodiment) arranged inside the front tunnel portion from below; a second battery accessory (for example, a second battery accessory 832 in the embodiment) arranged inside the rear tunnel portion from below; and a high-voltage electric wire (for example, an electrical wiring 84 in the embodiment) that extends in the front-rear direction of the vehicle body across the floor cross member inside the floor tunnel, and connects the first battery accessory and the second battery accessory. The first battery accessory is formed higher than the second battery accessory.

DESCRIPTION OF THE EMBODIMENTS

Figure 1:
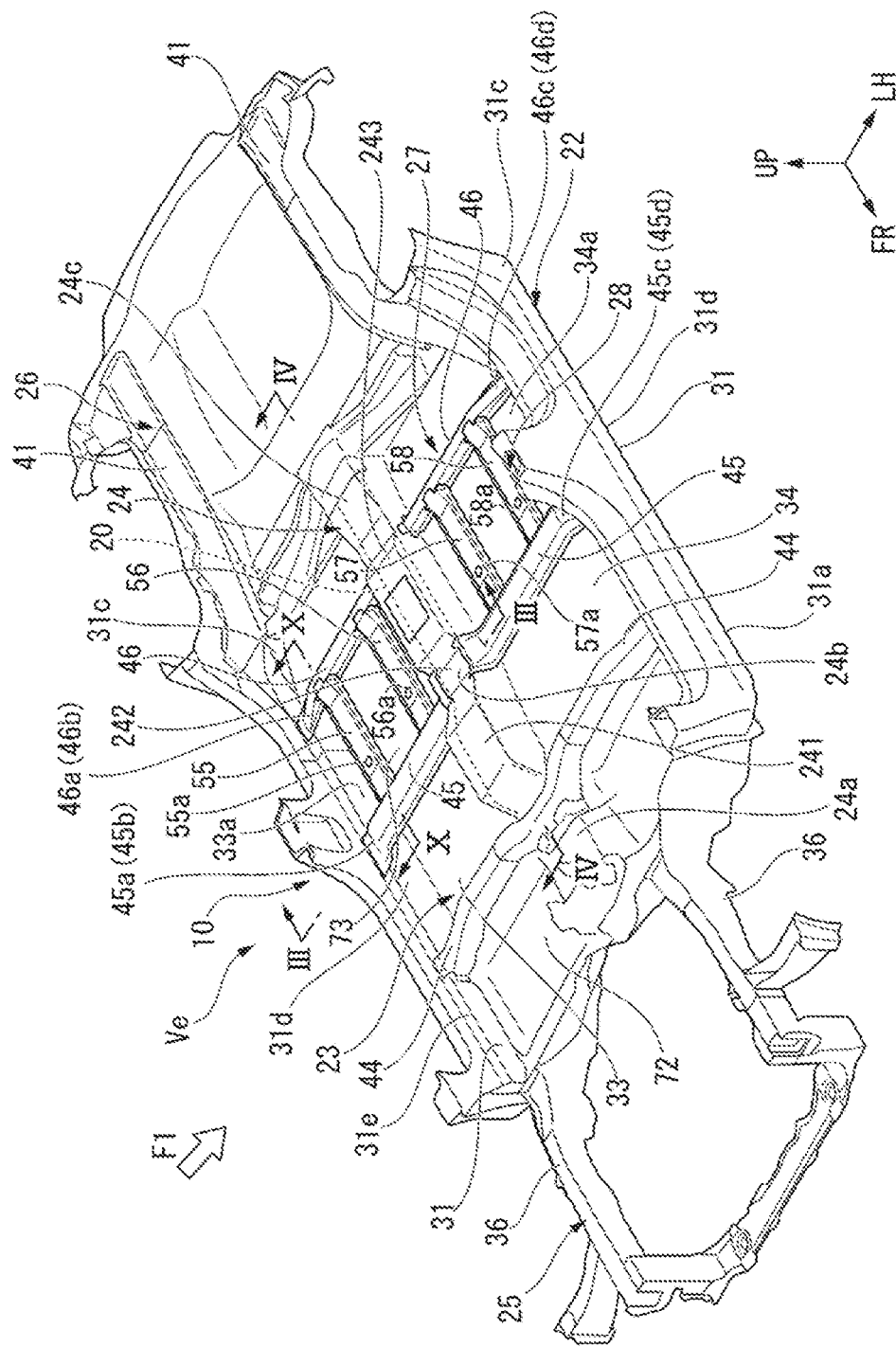
FIG. 1 is a perspective view of a vehicle equipped with a battery pack according to an embodiment of the disclosure as viewed diagonally from the front.

Hereinafter, a vehicle equipped with a battery pack according to an embodiment of the disclosure is described with reference to the drawings. In the drawing, an arrow FR indicates a front side of the vehicle, an arrow UP indicates an upper side of the vehicle, and an arrow LH indicates a left side of the vehicle. In addition, the vehicle equipped a battery pack has a substantially symmetrical configuration. Thus, hereinafter, left and right constituent members are described with the same reference signs.

<Vehicle Main Body>

Figure 2:
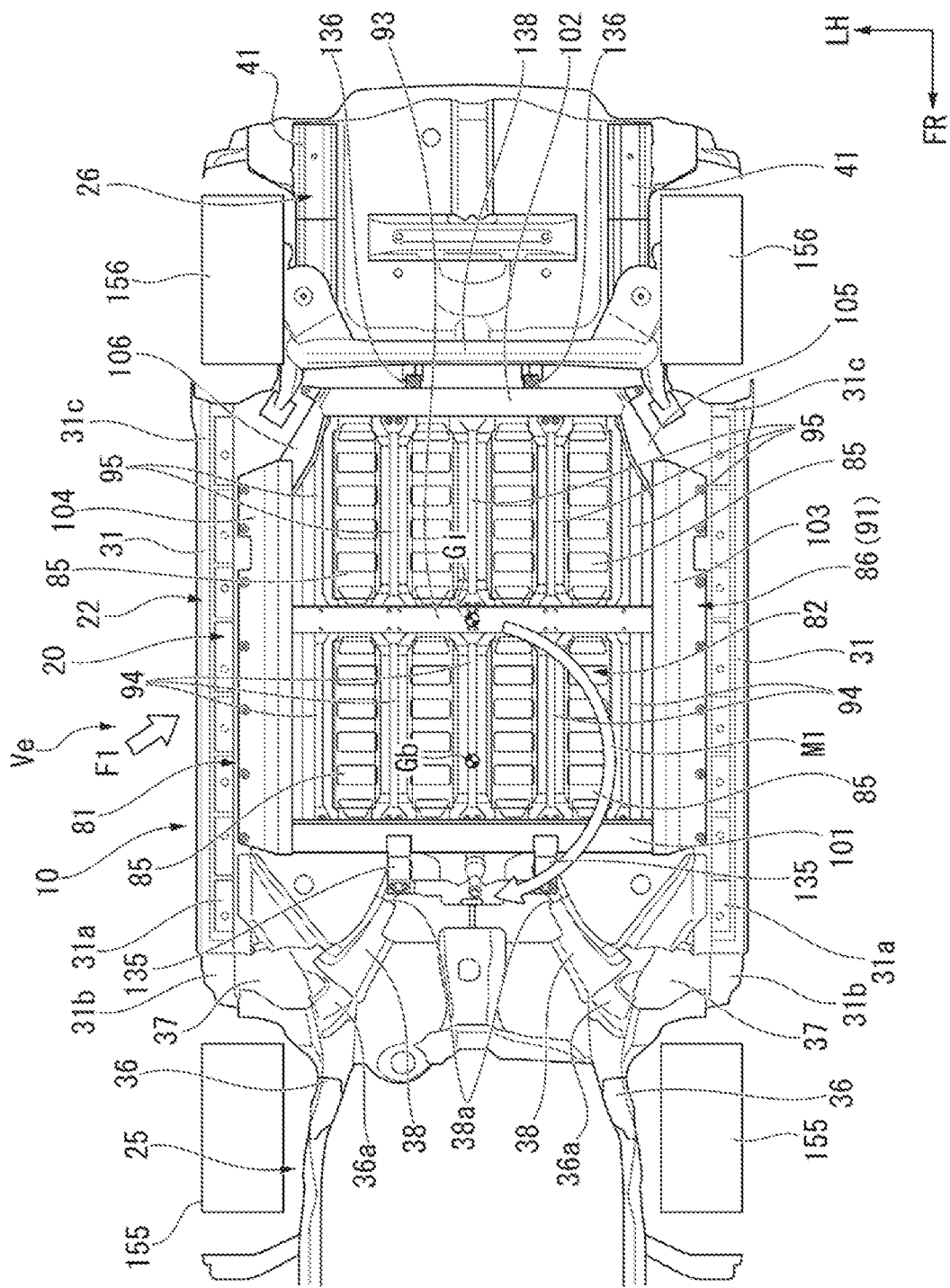
FIG. 2 is a bottom view showing the vehicle equipped with a battery pack according to an embodiment.

As shown in FIGS. 1 and 2, a vehicle Ve equipped with a battery pack includes a vehicle main body (hereinafter, also referred to as vehicle body 10) 10 and a battery pack 20. Hereinafter, the vehicle Ve equipped with a battery pack may be simply referred to as "vehicle Ve".

The vehicle main body 10 includes a side sill unit 22, a floor panel 23, a floor tunnel 24, a front side frame unit 25, a rear frame unit 26, a floor cross member unit 27, and a floor longitudinal frame unit 28.

The side sill unit 22 includes a right side sill (side sill) 31 and a left side sill (side sill) 31. The right side sill 31 is a highly rigid member that is formed in a closed cross section and constitutes a part of the framework of the vehicle body 10. The right side sill 31 is arranged on a right outer side in a vehicle width direction (one side of both side portions in the vehicle width direction) and extends in the front-rear direction of the vehicle body along the right outer side portion of the floor panel 23 in the vehicle width direction.

The left side sill 31 is a highly rigid member that is formed in a closed cross section and constitutes a part of the framework of the vehicle body 10. The left side sill 31 is arranged at a left outer side in the vehicle width direction (the other side of both side portions in the vehicle width direction) and extends in the front-rear direction of the vehicle body along the left outer side portion of the floor panel 23 in the vehicle width direction.

The floor panel 23 is arranged between the left side sill 31 and the right side sill 31. The floor panel 23 is a plate-shaped member having a substantially rectangular shape in a plan view and forms a floor portion of the vehicle Ve. The floor panel 23 includes a first floor portion 33 and a second floor portion 34.

The first floor portion 33 is arranged on the right side in the vehicle width direction between the right side sill 31 and the floor tunnel 24. The second floor portion 34 is arranged on the left side in the vehicle width direction between the left side sill 31 and the floor tunnel 24.

The floor tunnel 24 is extended in the front-rear direction of the vehicle body between the first floor portion 33 and the second floor portion 34. That is, a pair of the first floor portions 33 and the second floor portions 34 are arranged on both sides of the floor tunnel 24 in the vehicle width direction. The floor tunnel 24 is raised upward from the floor panel 23. The floor tunnel 24 is described later in detail.

The front side frame unit 25 includes a right front side frame (front side frame) 36 and a left front side frame (front side frame) 36. The right front side frame 36 and the left front side frame 36 are arranged in front of the battery pack 20 in the vehicle body.

The right front side frame 36 extends from a front portion 31a of the right side sill 31 toward the front of the vehicle body and is formed in a substantially V-shape in a plan view. The right front side frame 36 is a highly rigid member that is formed in a closed cross section and constitutes a part of the framework of the vehicle body 10. The right front side frame 36 has a bent portion (a rear end portion of the right front side frame 36) 36a connected to a front end portion 31b of the right side sill 31 by a right outrigger 37. A right branch portion (branch portion) 38 is joined to a right bent portion 36a. The right branch portion 38 is extended inward in an inclined manner in the vehicle width direction toward the rear of the vehicle body. A rear end portion 38a of the right branch portion 38 is coupled to a right front support bracket 135 (described later) of the battery pack 20.

The left front side frame 36 extends from the front portion 31a of the left side sill 31 toward the front of the vehicle body and is formed in a substantially V-shape in a plan view. The left front side frame 36 is a highly rigid member that is formed in a closed cross section and constitutes a part of the framework of the vehicle body 10. The left front side frame 36 has a bent portion (a rear end portion of the left front side frame 36) 36a connected to the front end portion 31b of the left side sill 31 by a left outrigger 37. A left branch portion (branch portion) 38 is joined to a left bent portion 36a. The left branch portion 38 is extended inward in an inclined manner in the vehicle width direction toward the rear of the vehicle body. A rear end portion 38a of the left branch portion 38 is coupled to a left front support bracket 135 (described later) of the battery pack 20.

The rear frame unit 26 has a right rear frame 41 and a left rear frame 41. The right rear frame 41 and the left rear frame 41 are arranged at the rear of the battery pack 20 in the vehicle body.

The right rear frame 41 extends from a rear end portion 31c of the right side sill 31 toward the rear of the vehicle body and is formed in a substantially J-shape in a plan view. The right rear frame 41 is a highly rigid member that is formed in a closed cross section and constitutes a part of the framework of the vehicle body 10.

The left rear frame 41 extends from a rear end portion 31c of the left side sill 31 toward the rear of the vehicle body and is formed in a substantially J-shape in a plan view. The left rear frame 41 is a highly rigid member that is formed in a closed cross section and constitutes a part of the framework of the vehicle body 10.

The floor cross member unit 27 is arranged between the right side sill 31 and the left side sill 31, and is joined along an upper surface of the floor panel 23.

The floor cross member unit 27 includes a right first floor cross member 44, a left first floor cross member 44, a right second floor cross member (floor cross member) 45, a left second floor cross member (floor cross member) 45, a right third floor cross member (another floor cross member) 46, and a left third floor cross member (another floor cross member) 46.

A pair of the right first floor cross member 44 and the left first floor cross member 44 is arranged on both sides of the floor tunnel 24 in the vehicle width direction. A pair of the right second floor cross member 45 and the left second floor cross member 45 is arranged on both sides of the floor tunnel 24 in the vehicle width direction at the vehicle body rear of the right first floor cross member 44 and the left first floor cross member 44.

A pair of the right third floor cross member 46 and the left third floor cross member 46 is arranged on both sides of the floor tunnel 24 in the vehicle width direction at the vehicle body rear of the right second floor cross member 45 and the left second floor cross member 45.

The right third floor cross member 46 extends in the vehicle width direction along the right second floor cross member 45, and is connected via a first floor longitudinal frame 55 and a second floor longitudinal frame 56 described later. The left third floor cross member 46 extends in the vehicle width direction along the left second floor cross member 45, and is connected via a third floor longitudinal frame 57 and a fourth floor longitudinal frame 58 described later.

The right first floor cross member 44 is extended in the vehicle width direction on the first floor portion 33 between the vicinity of the front portion 31a of the right side sill 31 and a front portion 24a of the floor tunnel 24. The right first floor cross member 44 is raised from an upper surface of the first floor portion 33 and forms a closed cross section with the first floor portion 33.

The left first floor cross member 44 is extended in the vehicle width direction on the second floor portion 34 between the front portion 31a of the left side sill 31 and the front portion 24a of the floor tunnel 24. The left first floor cross member 44 is raised from an upper surface of the second floor portion 34 and forms a closed cross section with the second floor portion 34.

Figure 3:
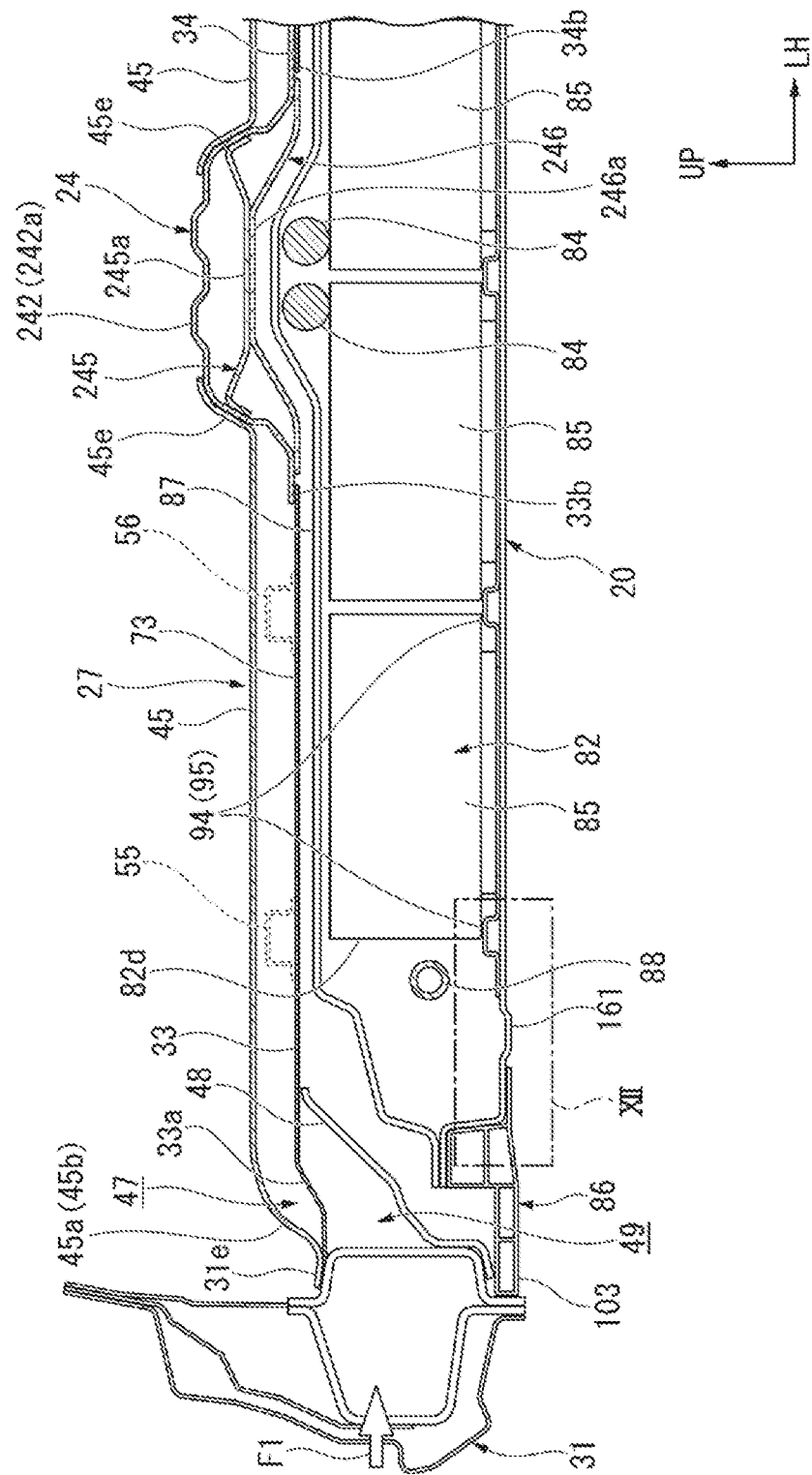
FIG. 3 is a cross-sectional view in which the vehicle equipped with a battery pack in FIG. 1 is fractured at line III-III.

As shown in FIGS. 1 and 3, the right second floor cross member 45 is extended in the vehicle width direction between a center 31d of the right side sill 31 and a center 24b of the floor tunnel 24. The right second floor cross member 45 is raised from the upper surface of the first floor portion 33 and forms a closed cross section with the first floor portion 33. A top portion 45b of a right end portion (end portion) 45a of the right second floor cross member 45 is inclined downward toward a right outer side in the vehicle width direction to the center 31d of the right side sill 31. Hereinafter, the right end portion 45a of the right second floor cross member 45 may also be referred to as "cross member right end portion 45a".

A cross member inclined closed cross section (closed cross section) 47 is formed by the cross member right end portion 45a and a right end portion 33a of the first floor portion 33.

An inclined member 48 is arranged below the cross member right end portion 45a. The inclined member 48 is arranged below the first floor portion 33 (specifically, the right end portion 33a) in a manner of sandwiching the right end portion (the portion in the vicinity of the side sill 31) 33a of the first floor portion 33 together with the cross member right end portion 45a.

The inclined member 48 forms an inclined closed cross section (closed cross section) 49 to the center 31d of the right side sill 31 together with the right end portion 33a of the first floor portion 33. Thereby, the right end portion 33a of the first floor portion 33 is reinforced by the right second floor cross member 45 and the inclined member 48. Here, the inclined closed cross section 49 is formed larger than the cross member inclined closed cross section 47.

Hereinafter, the left second floor cross member 45, the right third floor cross member 46, and the left third floor cross member 46 are described. Note that, in the following description, for the sake of convenience, the cross member inclined closed cross section, the inclined member, and the inclined closed cross section are described with the same signs as the cross member inclined closed cross section 47, the inclined member 48, and the inclined closed cross section 49 described for the right second floor cross member 45.

The left second floor cross member 45 is extended in the vehicle width direction between the center 31d of the left side sill 31 and the center 24b of the floor tunnel 24. The left second floor cross member 45 is raised from the upper surface of the second floor portion 34 and forms a closed cross section with the second floor portion 34. A top portion 45d of a left end portion (end portion) 45c of the left second floor cross member 45 is inclined downward toward the left outer side in the vehicle width direction to the center 31d of the left side sill 31. Hereinafter, the left end portion 45c of the left second floor cross member 45 may also be referred to as "cross member left end portion 45c".

The cross member inclined closed cross section (closed cross section) 47 is formed by the cross member left end portion 45c and a left end portion 34a of the second floor portion 34.

An inclined member 48 (not shown) is arranged below the cross member left end portion 45c. The inclined member 48 is arranged below the second floor portion 34 (specifically, the left end portion 34a) in a manner of sandwiching the left end portion (the portion in the vicinity of the side sill 31) 34a of the second floor portion 34 together with the cross member left end portion 45c.

The inclined member 48 forms the inclined closed cross section (closed cross section) 49 (not shown) to the center 31d of the left side sill 31 together with the left end portion 34a of the second floor portion 34. Thereby, the left end portion 34a of the second floor portion 34 is reinforced by the left second floor cross member 45 and the inclined member 48. Here, the inclined closed cross section 49 is formed larger than the cross member inclined closed cross section 47.

The right third floor cross member 46 is extended in the vehicle width direction on the first floor portion 33 between the vicinity of the rear end portion 31c of the right side sill 31 and the vicinity of a rear end portion 24c of the floor tunnel 24. The right third floor cross member 46 is raised from the upper surface of the first floor portion 33 and forms a closed cross section with the first floor portion 33. A top portion 46b of a right end portion (end portion) 46a of the right third floor cross member 46 is inclined downward toward the outer side in the vehicle width direction to the vicinity of the rear end portion 31c of the right side sill 31. Hereinafter, the right end portion 46a of the right third floor cross member 46 may also be referred to as "cross member right end portion 46a".

The cross member inclined closed cross section (closed cross section) 47 is formed by the cross member right end portion 46a and the right end portion 33a of the first floor portion 33.

An inclined member 48 (not shown) is arranged below the cross member right end portion 46a. The inclined member 48 is arranged below the first floor portion 33 (specifically, the right end portion 33a) in a manner of sandwiching the right end portion (the portion in the vicinity of the side sill 31) 33a of the first floor portion 33 together with the cross member right end portion 46a.

The inclined member 48 forms the inclined closed cross section (closed cross section) 49 (not shown) to the vicinity of the rear end portion 31c of the right side sill 31 together with the right end portion 33a of the first floor portion 33. Thereby, the right end portion 33a of the first floor portion 33 can be reinforced by the right third floor cross member 46 and the inclined member 48. Here, the inclined closed cross section 49 is formed larger than the cross member inclined closed cross section 47.

The left third floor cross member 46 is extended in the vehicle width direction on the second floor portion 34 between the vicinity of the rear end portion 31c of the left side sill 31 and the vicinity of the rear end portion 24c of the floor tunnel 24. The left third floor cross member 46 is raised from the upper surface of the second floor portion 34 and forms a closed cross section with the second floor portion 34. A top portion 46d of a left end portion (end portion) 46c of the left third floor cross member 46 is inclined downward toward the outer side in the vehicle width direction to the vicinity of the rear end portion 31c of the left side sill 31. Hereinafter, the left end portion 46c of the left third floor cross member 46 may also be referred to as "cross member left end portion 46c".

The cross member inclined closed cross section (closed cross section) 47 is formed by the cross member left end portion 46c and the left end portion 34a of the second floor portion 34.

An inclined member 48 (not shown) is arranged below the cross member left end portion 46c. The inclined member 48 is arranged below the second floor portion 34 (specifically, the left end portion 34a) in a manner of sandwiching the left end portion (the portion in the vicinity of the side sill 31) 34a of the second floor portion 34 together with the cross member left end portion 46c.

The inclined member 48 forms the inclined closed cross section (closed cross section) 49 (not shown) up to the vicinity of the rear end portion 31c of the left side sill 31 together with the left end portion 34a of the second floor portion 34. Thereby, the left end portion 34a of the second floor portion 34 can be reinforced by the left third floor cross member 46 and the inclined member 48. Here, the inclined closed cross section 49 is formed larger than the cross member inclined closed cross section 47.

Moreover, in the description of the left and right second floor cross members 45 and the left and right third floor cross members 46, the reason for making the inclined closed cross section 49 larger than the cross member inclined closed cross section 47 is described later in detail.

As shown in FIG. 1, the floor tunnel 24 intersects (in the embodiment, be orthogonal to) the left and right first floor cross members 44, the left and right second floor cross members 45, and the left and right third floor cross members 46 and extends in the front-rear direction of the vehicle body.

The floor tunnel 24 has a front tunnel portion 241, a central tunnel portion 242, and a rear tunnel portion 243. The front tunnel portion 241 is formed in front of the left and right second floor cross members 45 in the vehicle body in the vicinity of the front portion 24a of the floor tunnel 24.

The central tunnel portion 242 is formed at a portion (the center 24b of the floor tunnel 24) corresponding to the left and right second floor cross members 45 at the vehicle body rear of the front tunnel portion 241. The rear tunnel portion 243 is formed at a latter half portion of the floor tunnel 24 at the rear of the central tunnel portion 242 and the left and right second floor cross members 45 in the vehicle body.

Figure 4:
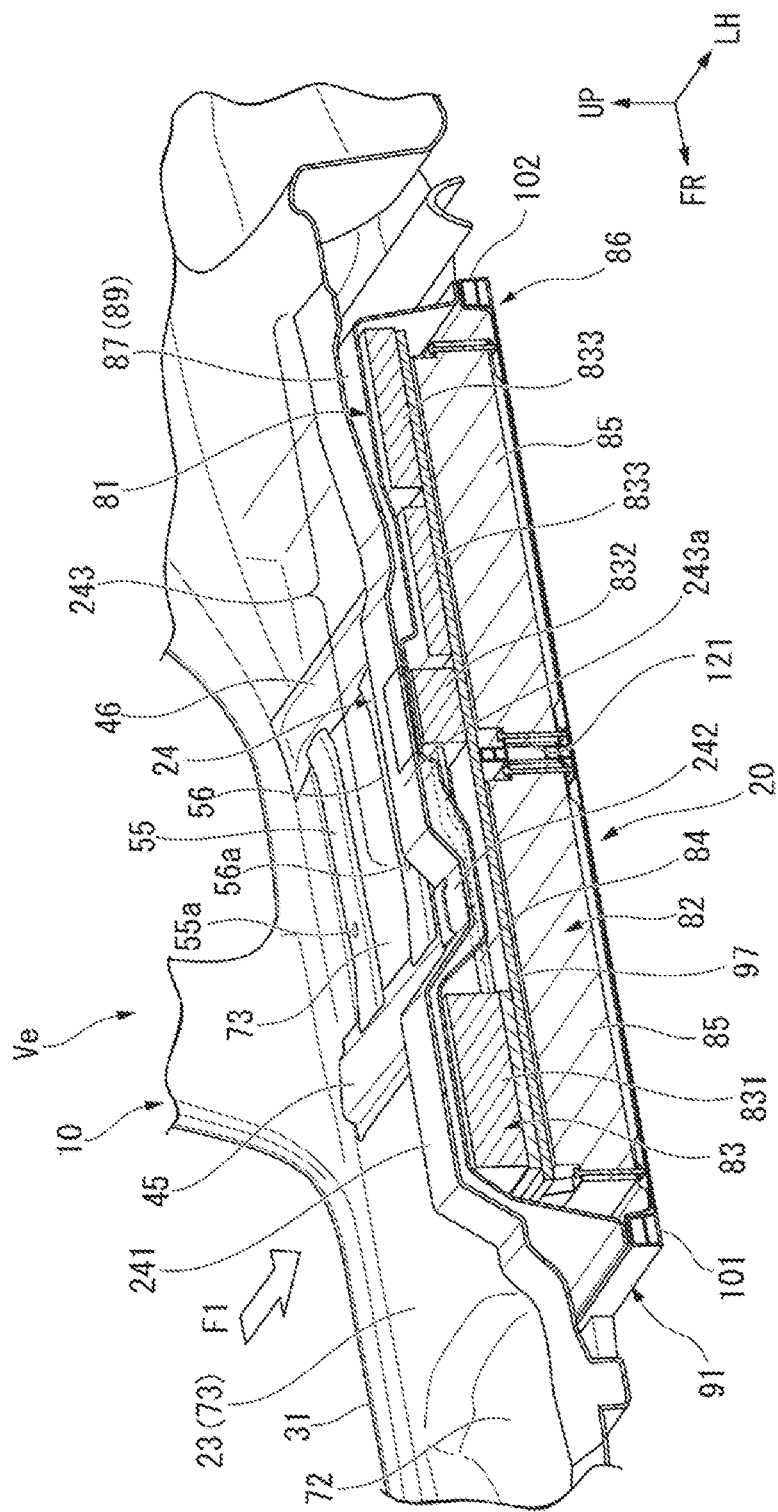
FIG. 4 is a perspective view in which the vehicle equipped with a battery pack in FIG. 1 is fractured at line IV-IV.

As shown in FIGS. 3 and 4, the front tunnel portion 241 is raised higher upward from the floor panel 23 as compared with the central tunnel portion 242 and the rear tunnel portion 243. In addition, the central tunnel portion 242 is raised less upward from the floor panel 23 as compared with the rear tunnel portion 243.

The right second floor cross member 45 and the left second floor cross member 45 are arranged on both sides of the central tunnel portion 242 in the vehicle width direction (see also FIG. 1).

Here, a height of the central tunnel portion 242 from the floor panel 23 is kept low. Thus, each inner end portion 45e of the right second floor cross member 45 and the left second floor cross member 45 extends to a top portion 242a of the central tunnel portion 242. Thereby, the right second floor cross member 45 and the left second floor cross member 45 are formed into a state of being integrally continuous in the vehicle width direction via the top portion 242a of the central tunnel portion 242. Thus, the rigidity and strength of the right second floor cross member 45 and the left second floor cross member 45 in the vehicle width direction are secured.

A first reinforcing material 245 and a second reinforcing material 246 are arranged inside the central tunnel portion 242. The first reinforcing material 245 and the second reinforcing material 246 are joined in a state that central portions 245a and 246a formed flat are overlapped in the up-down direction. Both end portions of the first reinforcing material 245 in the vehicle width direction are inclined upward from the central portion 245a toward the outer side in the vehicle width direction. Both end portions of the first reinforcing member 245 in the vehicle width direction are respectively connected to each inner end portion 45e of the pair of the right second floor cross member 45 and the left second floor cross member 45 via the central tunnel portion 242.

In addition, the first floor portion 33 and the second floor portion 34 are arranged on both sides of the central tunnel portion 242 in the vehicle width direction. Both end portions of the second reinforcing member 246 in the vehicle width direction are inclined downward from the central portion 246a toward the outer side in the vehicle width direction. Both end portions of the second reinforcing member 246 in the vehicle width direction are respectively connected to a pair of an inner end portion 33b of the first floor portion 33 and an inner end portion 34b of the second floor portion 34 via the central tunnel portion 242.

Here, the first reinforcing member 245 and the second reinforcing member 246 are integrally formed in a substantially X-shape (X-shape) in a front view. Thereby, the rigidity and strength of the first reinforcing material 245 and the second reinforcing material 246 are secured inside the central tunnel portion 242.

Thus, for example, a load F1 input through the left and right second floor cross members 45 by a side collision can be supported by the first reinforcing member 245 and the second reinforcing member 246. Thereby, for example, it is not necessary to increase a plate thickness of the first reinforcing material 245 and the second reinforcing material 246 to reinforce the central tunnel portion 242 (that is, the floor tunnel 24), and a yield strength of the first reinforcing material 245 and the second reinforcing material 246 can be kept low to reduce the weight.

As shown in FIGS. 1 and 4, the floor longitudinal frame unit 28 has a plurality of first to fourth floor longitudinal frames (floor longitudinal frames) 55 to 58 spaced apart on the floor panel 23 in the vehicle width direction. Specifically, the floor longitudinal frame unit 28 includes the first floor longitudinal frame 55 and the second floor longitudinal frame 56 arranged on the first floor portion 33, and the third floor longitudinal frame 57 and the fourth floor longitudinal frame 58 arranged on the second floor portion 34.

The first floor longitudinal frame 55 and the second floor longitudinal frame 56 are arranged apart from each other on the first floor portion 33 in the vehicle width direction. The first floor longitudinal frame 55 intersects (in the embodiment, be orthogonal to) the right second floor cross member 45 and the right third floor cross member 46, and extends in the front-rear direction of the vehicle body. Similarly, the second floor longitudinal frame 56 intersects (in the embodiment, be orthogonal to) the right second floor cross member 45 and the right third floor cross member 46, and extends in the front-rear direction of the vehicle body.

The first floor longitudinal frame 55 and the second floor longitudinal frame 56 are raised upward from the first floor portion 33 (that is, the floor panel 23), and form a closed cross section together with the first floor portion 33. Each front end portion of the first floor longitudinal frame 55 and the second floor longitudinal frame 56 is joined (coupled) to the right second floor cross member 45, and each rear end portion of the first floor longitudinal frame 55 and the second floor longitudinal frame 56 is joined (coupled) to the right third floor cross member 46. Note that, the number of the floor longitudinal frames arranged on the first floor portion 33 can be arbitrarily selected.

The third floor longitudinal frame 57 and the fourth floor longitudinal frame 58 are arranged apart from each other on the second floor portion 34 in the vehicle width direction. The third floor longitudinal frame 57 intersects (in the embodiment, be orthogonal to) the left second floor cross member 45 and the left third floor cross member 46, and extends in the front-rear direction of the vehicle body. Similarly, the fourth floor longitudinal frame 58 intersects (in the embodiment, be orthogonal to) the left second floor cross member 45 and the left third floor cross member 46, and extends in the front-rear direction of the vehicle body.

The third floor longitudinal frame 57 and the fourth floor longitudinal frame 58 are raised upward from the second floor portion 34 (that is, the floor panel 23), and form a closed cross section together with the second floor portion 34. Each front end portion of the third floor longitudinal frame 57 and the fourth floor longitudinal frame 58 is joined (coupled) to the left second floor cross member 45, and each rear end portion of the third floor longitudinal frame 57 and the fourth floor longitudinal frame 58 is joined (coupled) to the left third floor cross member 46. Note that, the number of the floor longitudinal frames arranged on the second floor portion 34 can be arbitrarily selected.

Figure 5:
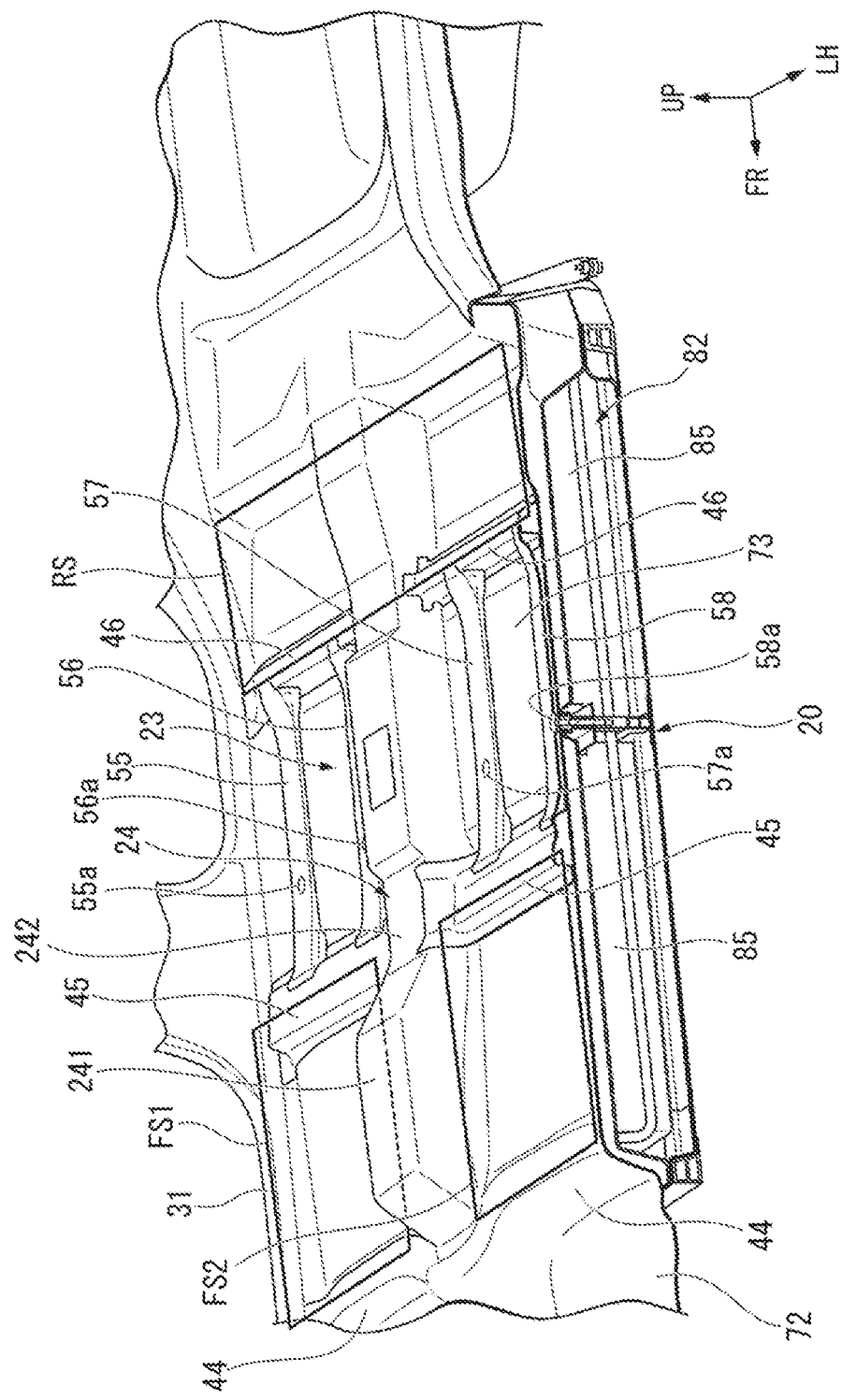
FIG. 5 is a perspective view illustrating a positional relationship between a front seat, a rear seat and a floor tunnel of the vehicle equipped with a battery pack according to an embodiment.

As shown in FIG. 5, a front portion (front leg) and a rear portion (rear leg) of a right front seat (front seat) FS1 are respectively fixed to the right first floor cross member 44 and the right second floor cross member 45. A front portion (front leg) and a rear portion (rear leg) of a left front seat (front seat) FS2 are respectively fixed to the left first floor cross member 44 and the left second floor cross member 45.

Here, the front tunnel portion 241 of the floor tunnel 24 is arranged between the left and right first floor cross members 44 and the left and right second floor cross members 45 in the front-rear direction of the vehicle body. That is, the front tunnel portion 241 is arranged between the right front seat FS1 and the left front seat FS2. Thus, the front tunnel portion 241 can be accommodated inside, for example, a center console (not shown).

In addition, a front portion (front leg) of a rear seat RS is fixed to the right third floor cross member 46 and the left third floor cross member 46.

As shown in FIGS. 1, 3, and 5, in the floor panel 23, a front floor portion 72 is formed at a portion in the vehicle body front of the battery pack 20, and a main floor portion 73 is formed at a portion above the battery pack 20. The front floor portion 72 is arranged below the main floor portion 73 in front of the battery pack 20 in the vehicle body.

The main floor portion 73 is joined to each upper end 31e (the left upper end 31e is not shown) of the right side sill 31 and the left side sill 31. By joining the main floor portion 73 along each upper end 31e of the right side sill 31 and the left side sill 31, a boundary between the main floor portion 73 and the right side sill 31 can be formed flat without any step in the up-down direction. Also, a boundary between the main floor portion 73 and the left side sill 31 can be formed flat without any step in the up-down direction. Thereby, for example, the occupant can easily get on and off the vehicle Ve equipped with a battery pack.

The main floor portion 73 is joined to each upper end 31e of the right side sill 31 and the left side sill 31 to facilitate the entry and exit of the occupant. Therefore, it is difficult to secure the rigidity and strength of the portion in the vicinity of the left side sill 31 and the right side sill 31 against a load input by a side collision (hereinafter referred to as side collision load) F1.

Thus, a portion of the main floor portion 73 in the vicinity of the right side sill 31 (right end portion) is reinforced by the right second floor cross member 45 and the inclined member 48, as well as the right third floor cross member 46 and the inclined member 48. Similarly, a portion of the main floor portion 73 in the vicinity of the left side sill 31 (left end portion) is reinforced by the left second floor cross member 45 and the inclined member 48, as well as the left third floor cross member 46 and the inclined member 48.

Thus, the rigidity and strength of the right end portion of the main floor portion 73 on the right side sill 31 side and the left end portion of the main floor portion 73 on the left side sill 31 side can be secured. This allows, for example, the side collision load F1 input by a side collision to be supported by the left and right second floor cross members 45, the left and right third floor cross members 46, the inclined member 48, and the like. Therefore, the main floor portion 73 can be formed along each upper end 31e of the right side sill 31 and the left side sill 31, and the occupant can easily get on and off Furthermore, by joining the main floor portion 73 to each upper end 31e of the right side sill 31 and the left side sill 31, for example, a height of the main floor portion 73 can be increased. Thereby, for example, a height of the battery pack 20 in the up-down direction can be increased.

<Battery Pack>

Figure 6:
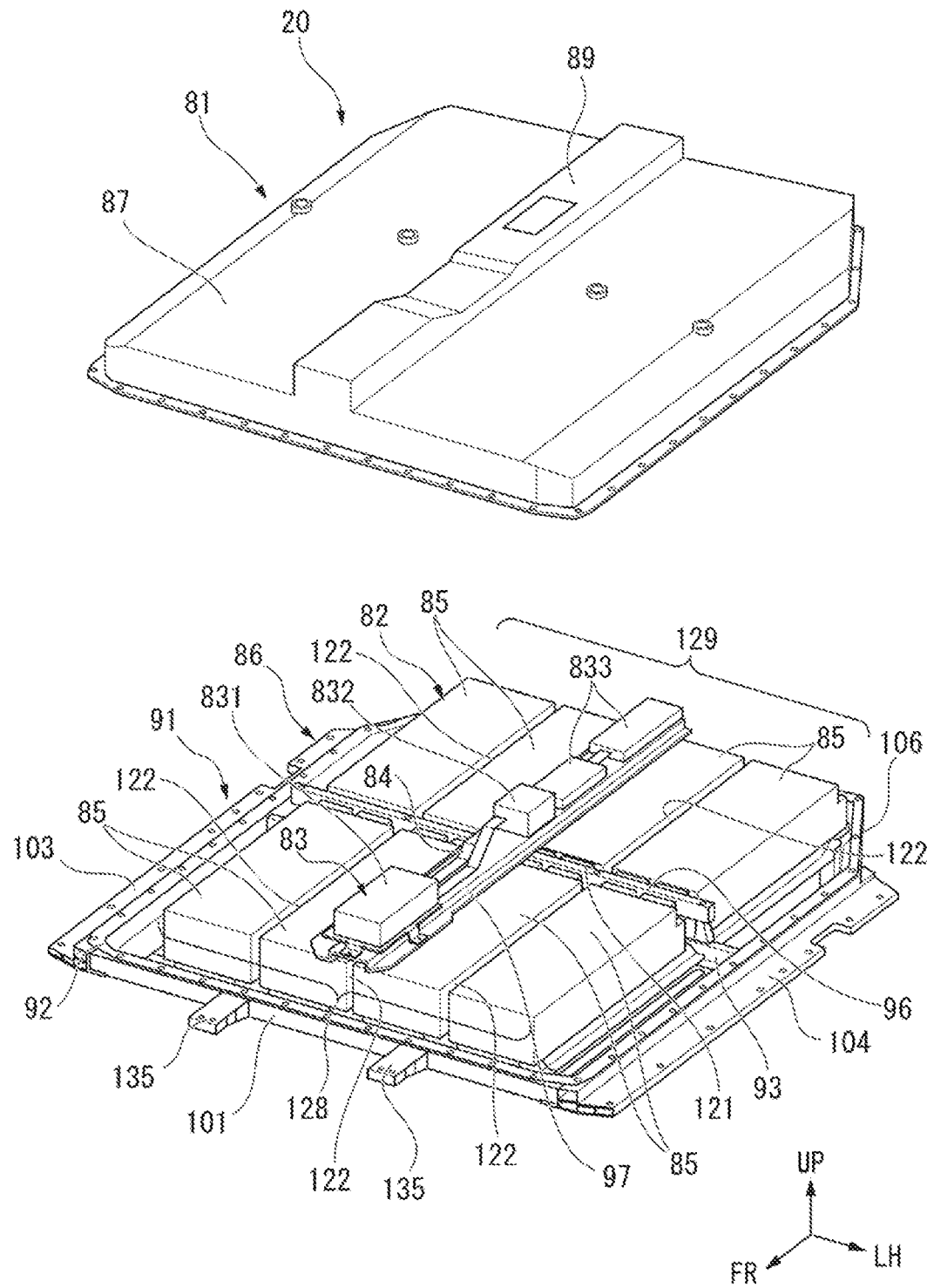
FIG. 6 is an exploded perspective view showing a state in which a case cover is removed from a battery pack of an embodiment.
Figure 7:
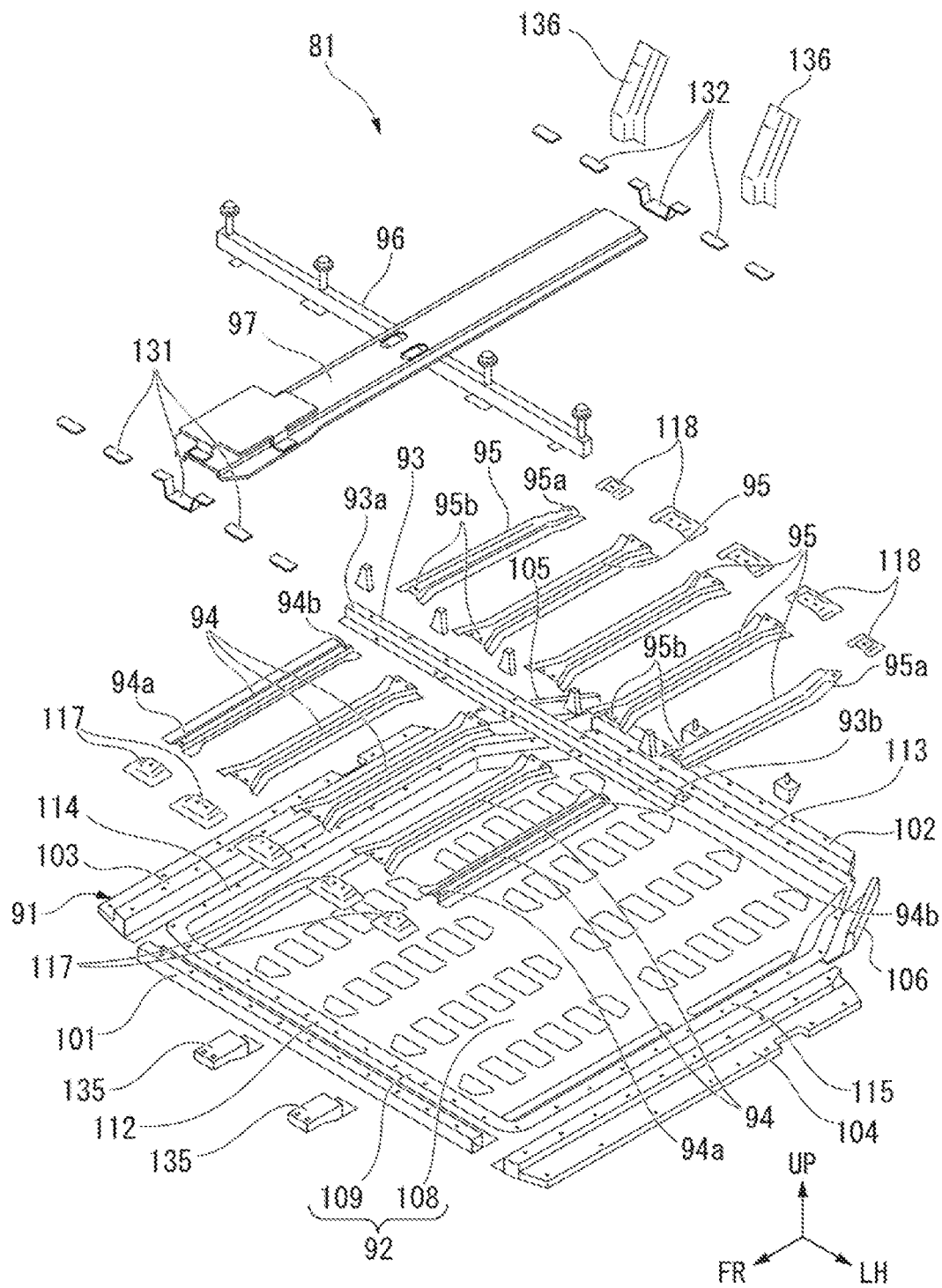
FIG. 7 is an exploded perspective view showing the battery pack in FIG. 6.

As shown in FIGS. 5 to 7, the battery pack 20 is arranged below the main floor portion 73 (that is, under the floor of the vehicle Ve). Furthermore, the battery pack 20 is arranged below the left and right second floor cross members 45, the left and right third floor cross members 46, and the first to fourth floor longitudinal frames 55 to 58.

Figure 11:
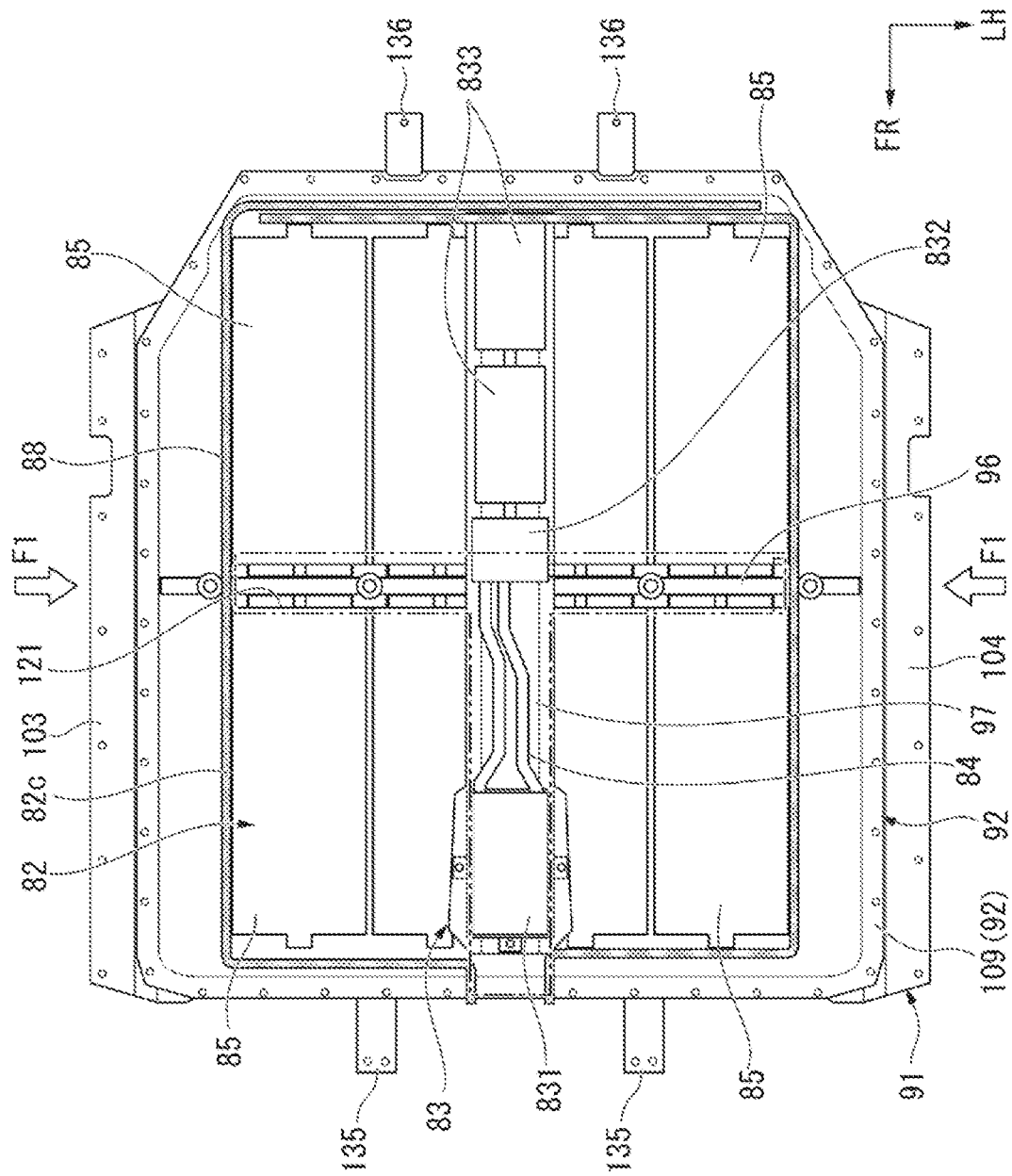
FIG. 11 is a plan view showing a state in which the case cover is removed from the battery pack of an embodiment.

The battery pack 20 includes a battery case 81, a battery module 82, an accessory unit 83, an electrical wiring (high-voltage electric wire) 84, and a water cooling pipe 88 (see FIG. 11).

(Battery Case)

The battery case 81 includes a case body 86 and a case cover 87. The case body 86 includes a case frame portion 91, a case portion (tray) 92, a lower cross member (tray cross member) 93, a first longitudinal frame 94, a second longitudinal frame 95, an upper cross member 96, and an upper deck (center frame) 97.

The case frame portion 91 includes a front frame (front portion) 101, a rear frame (rear portion) 102, a right frame (right side portion, side frame) 103, a left frame (left side portion, side frame) 104, a right inclined frame 105, and a left inclined frame 106.

The front frame 101 is arranged at a distance in the front of the vehicle body with respect to a front side edge of the battery module 82 and extends in the vehicle width direction. The rear frame 102 is arranged at a distance at the rear of the vehicle body with respect to a rear side edge of the battery module 82 and extends in the vehicle width direction. The right frame 103 is arranged at a distance on the right side in the vehicle width direction with respect to a right side edge of the battery module 82, and extends from a right end portion of the front frame 101 toward the rear of the vehicle body. The right frame 103 and the rear frame 102 are connected by the right inclined frame 105.

The left frame 104 is arranged at a distance on the left side in the vehicle width direction with respect to a left side edge of the battery module 82, and extends from a left end portion of the front frame 101 toward the rear of the vehicle body. The left frame 104 and the rear frame 102 are connected by the left inclined frame 106.

As shown in FIGS. 2, 6 and 7, the case frame portion 91 is formed in a substantially rectangular frame shape in a plan view by the front frame 101, the rear frame 102, the left frame 104, the right frame 103, the right inclined frame 105, and the left inclined frame 106. The case frame portion 91 is formed in a manner of covering an outer periphery of the battery module 82 at a distance.

The case frame portion 91 is attached to an outer periphery of the case portion 92. The case portion 92 is attached to the inside of the case frame portion 91 and is arranged below the battery module 82.

Specifically, the case portion 92 has a case bottom (a bottom surface of the battery pack 20, a bottom of the tray) 108 and a case peripheral wall 109.

The case bottom 108 is arranged below the battery module 82 and is formed in a substantially rectangular shape in a plan view. The case bottom 108 forms the bottom of the battery case 81, and easily deformable portions 161 (see FIG. 3) are arranged on both outer sides of the case bottom 108 in the vehicle width direction. The easily deformable portion 161 is described later in detail.

The case peripheral wall 109 is formed along an outer periphery of the case bottom 108. The case peripheral wall 109 has a case front wall 112, a case rear wall 113, a case right wall 114, and a case left wall 115. The case portion 92 is provided with the lower cross member 93, a plurality of the first longitudinal frames 94, and a plurality of the second longitudinal frames 95.

The lower cross member 93 is arranged at the center of the case portion 92 (particularly, the case bottom 108) in the front-rear direction of the vehicle body, and is extended toward the vehicle width direction. That is, the lower cross member 93 is a member that constitutes a central portion in the front-rear direction of the vehicle body. For example, in the lower cross member 93, a right end portion 93a is in contact with the case right wall 114, and a left end portion 93b is in contact with the case left wall 115. On the case bottom 108, a plurality of the first longitudinal frames 94 are arranged at intervals in the vehicle width direction in the vehicle body front of the lower cross member 93. On the case bottom 108, a plurality of the second longitudinal frames 95 are arranged at intervals in the vehicle width direction at the vehicle body rear of the lower cross member 93.

The plurality of first longitudinal frames 94 and the plurality of second longitudinal frames 95 are arranged in a manner of being spaced apart on the same line in the front-rear direction of the vehicle body. The lower cross member 93 is arranged between the plurality of first longitudinal frames 94 and the plurality of second longitudinal frames 95.

In the embodiment, one lower cross member 93 is illustrated, but the number of the lower cross member 93 can be selected as appropriate. In addition, in the embodiment, five first longitudinal frames 94 and five second longitudinal frames 95 are illustrated, but the number of the first longitudinal frame 94 and the number of the second longitudinal frame 95 can be selected as appropriate.

A front end portion 94a of the first longitudinal frame 94 is attached to the front frame 101 by a first mounting bracket 117 via the case bottom 108. In addition, a rear end portion 94b of the first longitudinal frame 94 is attached to the lower cross member 93.

A battery 85 is arranged vertically between a pair of adjacent first longitudinal frames 94, and the vertically arranged battery 85 is supported by the pair of first longitudinal frames 94.

A rear end portion 95a of the second longitudinal frame 95 is attached to the rear frame 102 by a second mounting bracket 118 via the case bottom 108. In addition, a front end portion 95b of the second longitudinal frame 95 is attached to the lower cross member 93.

The battery 85 is arranged vertically between a pair of adjacent second longitudinal frames 95, and the vertically arranged battery 85 is supported by the pair of second longitudinal frames 95.

The battery 85 is formed into a longitudinally elongated rectangular body by stacking a plurality of battery cells (not shown) in a longitudinal direction. Hereinafter, the longitudinally elongated battery 85 may also be referred to as "longitudinal battery 85". In addition, a vertical arrangement of the longitudinal battery 85 refers to an arrangement of the battery 85 with a longitudinal direction of the battery 85 directed toward the front-rear direction of the vehicle body (vertical direction).

In this way, on the case bottom 108 of the case portion 92, a plurality of the first longitudinal frames 94 and a plurality of the second longitudinal frames 95 are arranged at internals in the front-rear direction of the vehicle body and are directed toward the front-rear direction of the vehicle body. Furthermore, the lower cross member 93 is arranged between the plurality of first longitudinal frames 94 and the plurality of second longitudinal frames 95.

Thus, in case regions in the vehicle body front and at the vehicle body rear of the lower cross member 93, the plurality of longitudinal batteries 85 can be arranged vertically toward the front-rear direction of the vehicle body along the plurality of first longitudinal frames 94 and the plurality of second longitudinal frames 95. Accordingly, the plurality of longitudinal batteries 85 can be arranged vertically in an efficient manner, and a sufficient cruising range can thus be secured.

(Battery Module)

In the vehicle body front of the lower cross member 93, a plurality of front batteries 85 are supported vertically by the plurality of first longitudinal frames 94. At the vehicle body rear of the lower cross member 93, a plurality of rear batteries 85 are supported vertically by the plurality of second longitudinal frames 95. A first battery row 128 is constituted by the plurality of batteries 85 arranged on the front side, and a second battery row 129 is constituted by the plurality of batteries 85 arranged on the rear side.

A pair of the first battery row 128 and the second battery row 129 is arranged in the front-rear direction of the vehicle body. The first battery row 128 and the second battery row 129 constitute, for example, the battery module 82 for driving.

That is, the battery module 82 is supported by the plurality of first longitudinal frames 94 and the plurality of second longitudinal frames 95 in a state that the plurality of batteries 85 are vertically arranged with the longitudinal direction directed toward the front-rear direction of the vehicle body.

In the embodiment, an example in which a pair of the first battery row 128 and the second battery row 129 is arranged in the front-rear direction of the vehicle body has been described, but the disclosure is not limited thereto. As another example, the first battery row 128 and the second battery row 129 may be arranged in three or more rows in the front-rear direction of the vehicle body.

The battery module 82 has a first boundary portion 121 that is formed between the first battery row 128 and the second battery row 129 and extends in the vehicle width direction, and a second boundary portion 122 that extends in the front-rear direction of the vehicle body among the plurality of batteries 85. The first boundary portion 121 extends in the vehicle width direction along the lower cross member 93. The second boundary portion 122 extends in the front-rear direction of the vehicle body along the first longitudinal frames 94 and the second longitudinal frames 95.

The upper cross member 96 is arranged above the battery module 82 at a position corresponding to the first boundary portion 121.

Figure 8:
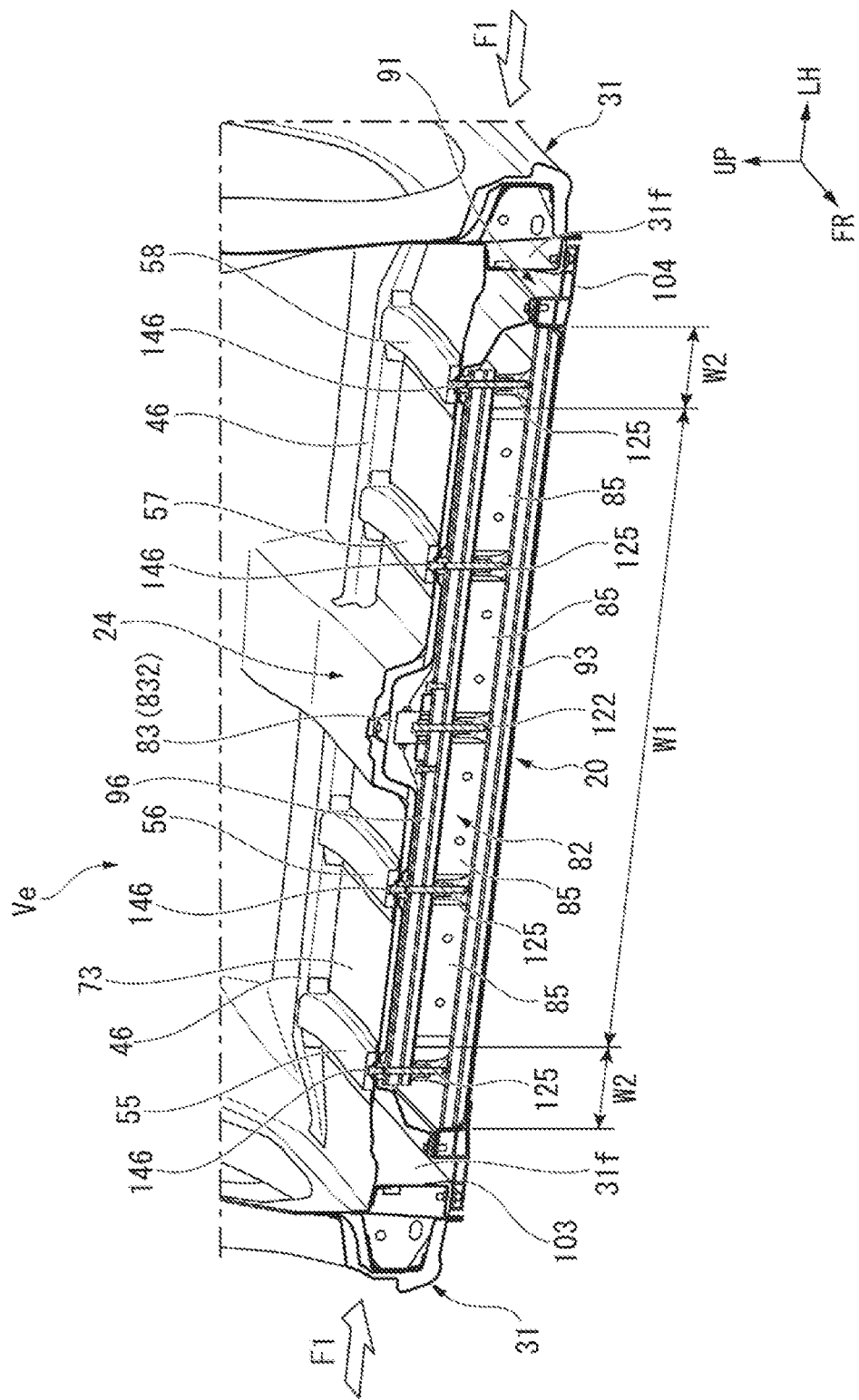
FIG. 8 is a perspective view in which the vehicle equipped with a battery pack of an embodiment is fractured at a first boundary portion of the battery pack.
Figure 9:
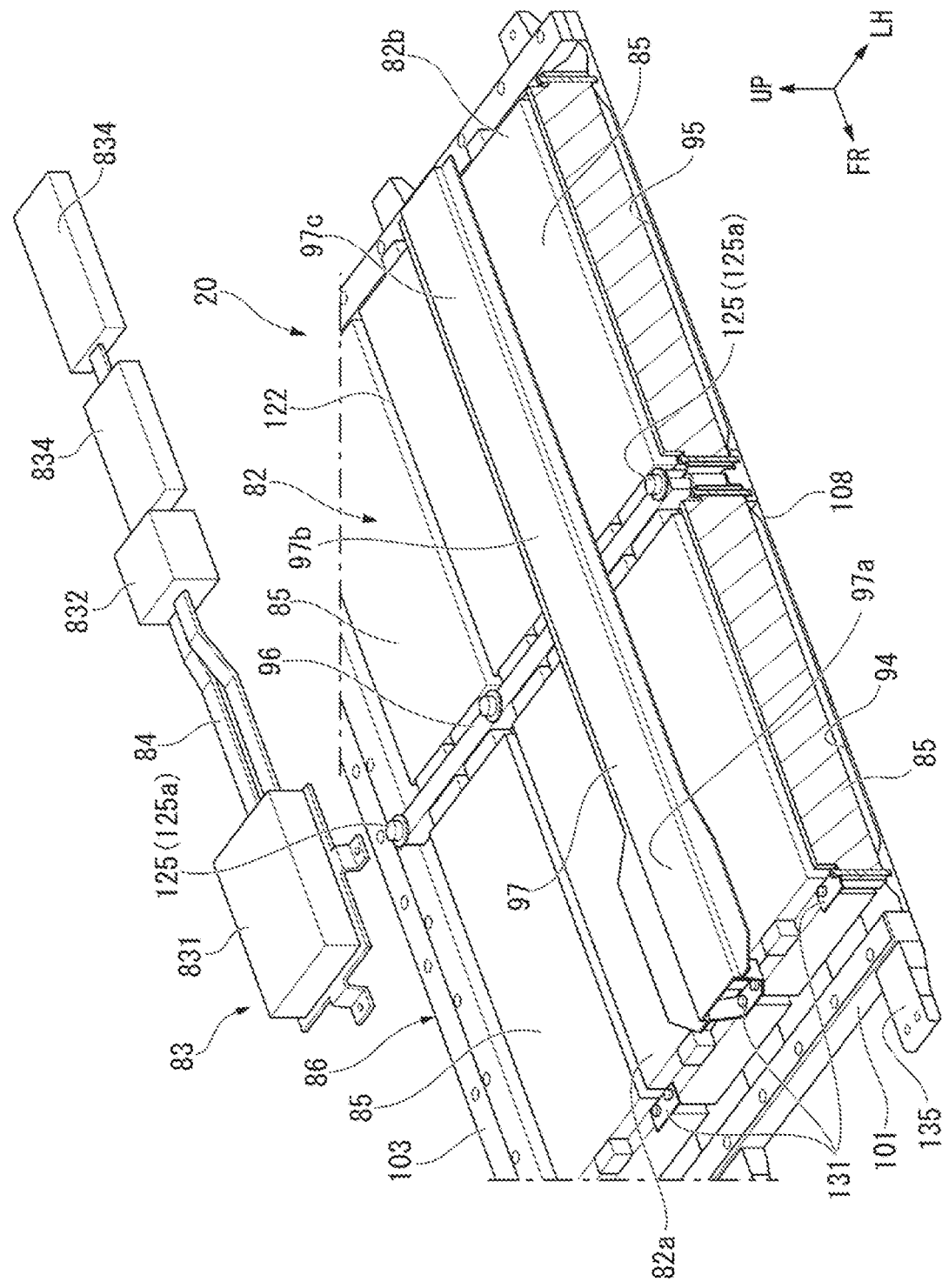
FIG. 9 is an exploded perspective view showing a state in which an accessory unit is disassembled from the battery pack of an embodiment.
Figure 10:
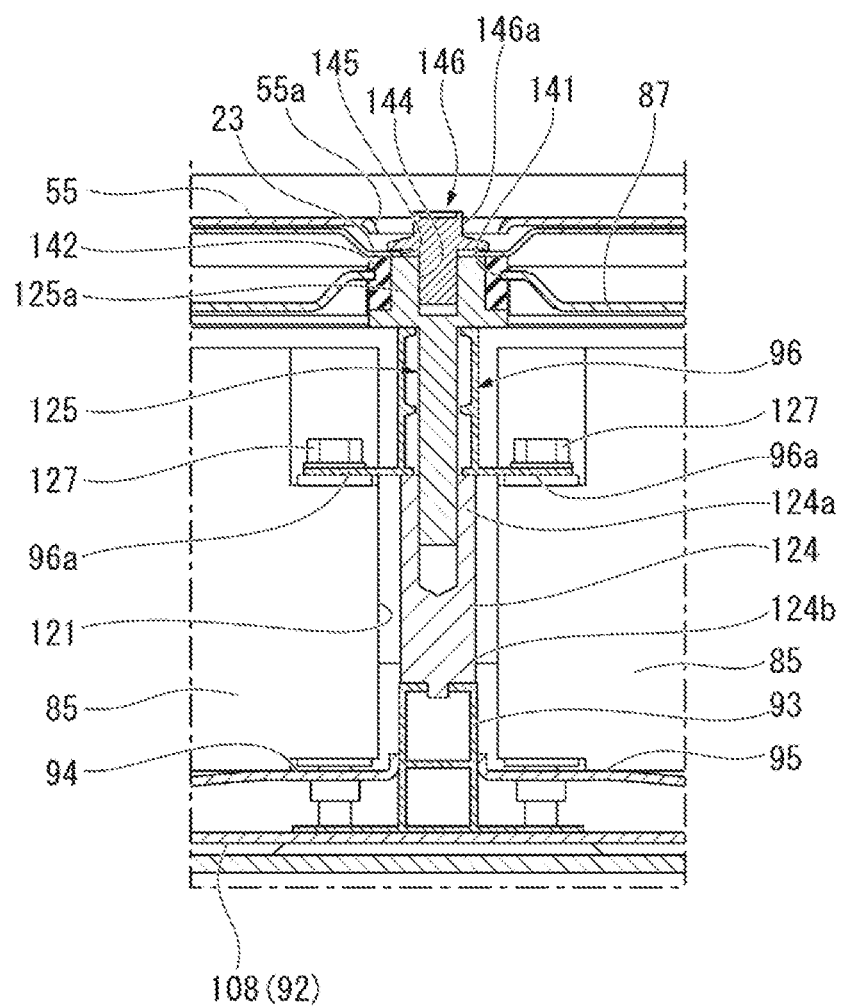
FIG. 10 is a cross-sectional view in which the vehicle equipped with a battery pack in FIG. 1 is fractured at line X-X.

As shown in FIGS. 8 to 10, the upper cross member 96 is arranged along the lower cross member 93. The upper cross member 96 is coupled to an upper end portion 124a of an upper and lower connecting collar 124 by a mounting bolt 125. A lower end portion 124b of the upper and lower connecting collar 124 is coupled to the lower cross member 93. Thereby, the upper cross member 96 is coupled to the lower cross member 93 via the mounting bolt 125 and the upper and lower connecting collar 124.

In this state, a flange 96a of the upper cross member 96 is coupled to the batteries 85 by a mounting bolt 127. Thereby, the plurality of batteries 85 are fixed from above by the upper cross member 96. Specifically, the upper cross member 96 connects the plurality of batteries 85 arranged in the front-rear direction of the vehicle body and also connects the plurality of batteries 85 arranged in the vehicle width direction at the center of the battery module 82 in the front-rear direction of the vehicle body.

In addition, the plurality of batteries 85 arranged in the vehicle width direction are connected at a front end portion 82a of the battery module 82 by a front connecting bracket 131 (see also FIG. 7). Furthermore, the plurality of batteries 85 arranged in the vehicle width direction are connected at a rear end portion 82b of the battery module 82 by a rear connecting bracket 132 (see FIG. 7).

In this way, the plurality of batteries 85 are placed on the plurality of first longitudinal frames 94 and the plurality of second longitudinal frames 95. Furthermore, the plurality of batteries 85 (that is, the battery modules 82) are fixed from above by the upper cross member 96.

Specifically, in the front-rear direction of the vehicle body and the vehicle width direction, the plurality of batteries 85 are connected at the central portion of the battery module 82 in the front-rear direction of the vehicle body by the upper cross member 96 from above. In addition, the front end portion 82a of the battery module 82 is connected by the front connecting bracket 131 in the vehicle width direction. Furthermore, the rear end portion 82b of the battery module 82 is connected by the rear connecting bracket 132 in the vehicle width direction.

Accordingly, the plurality of longitudinal batteries 85 (that is, the battery module 82) can be fixed stably and can be connected as a single unit while securing the rigidity of the battery module 82.

(Accessory Unit)

As shown in FIGS. 4, 6 and 9, the upper deck 97 is arranged above the battery module 82 and at the second boundary 122 in the center in the vehicle width direction among the plurality of second boundaries 122. The upper deck 97 is formed in a band shape and extends from the front end portion 82a to the rear end portion 82b of the battery module 82 in the front-rear direction of the vehicle body. The upper deck 97 is equipped with the accessory unit 83. The accessory unit 83 includes a first battery accessory 831, a second battery accessory 832, and a third battery accessory 833.

The first battery accessory 831 is, for example, a high-voltage junction board. The high-voltage junction board is, for example, an accessory that supplies electricity of the battery module 82 for driving to a drive motor (not shown).

The second battery accessory 832 is, for example, a cutoff switch. The cutoff switch is, for example, a switch that cuts off power supply of the battery module 82.

The third battery accessory 833 is, for example, an electronic control unit (ECU, control device) or the like. The ECU is, for example, a battery management unit that controls discharge and charge between the battery module 82 for driving and the drive motor.

The first battery accessory 831 is arranged in a state of being placed on a front portion 97a of the upper deck 97. The second battery accessory 832 is arranged in a state of being placed on a central portion 97b of the upper deck 97 at the vehicle body rear of the first battery accessory 831. The third battery accessory 833 is arranged in a state of being placed on a rear portion 97c of the upper deck 97 at the vehicle body rear of the second battery accessory 832.

The first battery accessory 831 is formed higher upward from a surface of the upper deck 97 as compared with the second battery accessory 832 and the third battery accessory 833. Hereinafter, the first battery accessory 831 may also be referred to as "tall first battery accessory 831". In addition, the second battery accessory 832 and the third battery accessory 833 may also be referred to as "short second battery accessory 832" and "short third battery accessory 833", respectively.

As shown in FIGS. 8 and 9, the accessory unit 83 is arranged above the battery module 82 in the center in the vehicle width direction and between the plurality of batteries 85 (that is, the second boundary portion 122 in the center in the vehicle width direction). Thus, a width dimension W1 of the battery module 82 in the vehicle width direction can be kept small without impairing a capacity of the battery module 82. Thereby, for example, a large collision stroke space (deformation allowable space) W2 that allows deformation caused by the side collision load F1 input by a side collision can be set.

(Electrical Wiring)

As shown in FIGS. 6 and 11, the electrical wiring 84 is arranged in a space of the first boundary portion 121 of the battery module 82 and a space of the second boundary portion 122 in the center in the vehicle width direction. The electrical wiring 84 connects the plurality of batteries 85, the first battery accessory 831, the second battery accessory 832, the third battery accessory 833, and the like.

That is, in the electrical wiring 84, battery terminals of the first battery row 128 and a plurality of battery terminals of the second battery row 129 are horizontally wired (routed) in the vehicle width direction in the space of the first boundary portion 121 along the lower cross member 93. In addition, the horizontally wired electrical wiring 84 is vertically wired (routed) in the front-rear direction of the vehicle body in a state of being bundled along an upper surface of the upper deck 97, and is connected to the drive motor (not shown) side.

Here, the load F1 input by a side collision can be supported by the lower cross member 93 and the upper cross member 96. Thereby, the electrical wiring 84 horizontally wired along the lower cross member 93 in the vehicle width direction can be protected from the load F1 by the lower cross member 93 and the upper cross member 96. In addition, the electrical wiring 84 vertically wired to the drive motor side in a state of being bundled along the upper surface of the upper deck 97 is arranged at a position relatively distant from the load F1 input by a side collision in the vehicle width direction. Thereby, the vertically wired electrical wiring 84 can be protected from the load F1.

Furthermore, the horizontally wired electrical wiring 84 and the vertically wired electrical wiring 84 are wired (routed) in, for example, a T-shape in a plan view. Alternatively, the horizontally wired electrical wiring 84 and the vertically wired electrical wiring 84 may be wired (routed) in, for example, a cross shape in a plan view. Thereby, the tall first battery accessory 831, the short second battery accessory 832, and the short third battery accessory 833 can be arranged on a wire of the electrical wiring 84, and the electrical wiring 84 can be shortened.

In addition, the water cooling pipe 88 is arranged on an outer peripheral 82c side of the battery module 82 and along the case peripheral wall (an inner wall surface of the tray) 109 of the case portion 92. The water cooling pipe 88 is arranged along the outer peripheral 82c of the battery module 82 in order to cool the battery module 82. Here, for example, by wiring the electrical wiring 84 in a T-shape or a cross shape, the electrical wiring 84 can be arranged away from the outer peripheral 82c side of the battery module 82. Thereby, the water cooling pipe 88 can be separated from the electrical wiring 84, and a water-impact prevention cover for preventing the electrical wiring 84 from being exposed to water can be eliminated.

As shown in FIGS. 4 and 6, the case cover 87 is attached to the case frame portion 91 from above in a state that the battery module 82, the accessory unit 83, the electrical wiring 84, and the water cooling pipe 88 (see FIG. 11) are accommodated in the case body 86.

In the case cover 87, a raised portion 89 extends in the front-rear direction of the vehicle body along the upper deck 97 at the center in the vehicle width direction. The raised portion 89 is formed to be uneven in the up-down direction corresponding to the accessory unit 83 (that is, the first battery accessory 831, the second battery accessory 832, and the third battery accessory 833) and the electrical wiring 84. The upper deck 97, the accessory unit 83, and the electrical wiring 84 are accommodated in the raised portion 89 from below. The battery pack 20 is assembled in this state and is attached under the floor of the vehicle Ve.

(Assembly of Battery Pack 20 Under Floor of Vehicle)

As shown in FIGS. 2 and 8, the right frame 103 is fixed to the inner panel 31f of the right side sill 31 from below. The left frame 104 is fixed to the inner panel 31f of the left side sill 31 from below.

The front frame 101 is fixed to a pair of the branch portions 38 via a pair of the front support brackets 135 (see also FIG. 6). The rear frame 102 is fixed to the rear cross member 138 via a pair of the rear support brackets 136 (see also FIG. 7).

The rear cross member 138 is a highly rigid member that is arranged at the rear of the battery pack 20 in the vehicle body so as to extend in the vehicle width direction, and constitutes a part of the framework of the vehicle body 10.

As shown in FIGS. 8 and 10, a head 125a of the mounting bolt 125 penetrates a through hole 141 of the case cover 87 and is in contact with the floor panel 23 on the upper side. In addition, a rubber member 142 arranged on the head 125a also penetrates the through hole 141 of the case cover 87 and is in contact with the floor panel 23 on the upper side.

A female screw 144 of the head 125a is arranged downward to fit to a mounting hole 145 of the floor panel 23. A mounting bolt 146 is screwed to the female screw 144 of the head 125a through the mounting hole 145 of the floor panel 23. A head 146a of the mounting bolt 146 protrudes upward from through holes 55a to 58a on the top of the first to fourth floor longitudinal frames 55 to 58.

Here, left and right flanges of the first to fourth floor longitudinal frames 55 to 58 are joined to the floor panel 23. Thus, the lower cross member (the central portion in the front-rear direction of the vehicle body) 93 of the battery pack 20 is fixed to the first to fourth floor longitudinal frames 55 to 58 via the floor panel 23.

Thereby, a large accommodation space for the battery module 82 can be secured inside the battery pack 20 to maximize the battery capacity of the battery pack 20, and furthermore the battery pack 20 can be stably fixed under the floor panel 23.

In this state, the battery pack 20 is assembled under the floor of the vehicle Ve. Furthermore, the plurality of batteries 85 of the battery module 82 accommodated in the battery pack 20 are arranged in a state of being vertically arranged with the longitudinal direction of the battery directed toward the front-rear direction of the vehicle body (see FIG. 6).

In addition, as shown in FIG. 4, the raised portion 89 of the case cover 87, the accessory unit 83 (the first battery accessory 831, the second battery accessory 832, and the third battery accessory 833), and the electrical wiring 84 are accommodated inside the floor tunnel 24 of the vehicle Ve.

Specifically, the first battery accessory 831 is accommodated inside the front tunnel portion 241 from below. The second battery accessory 832 and the third battery accessory 833 are accommodated inside the rear tunnel portion 243 from below. The electrical wiring 84 is accommodated inside the central tunnel portion 242 from below. Inside the central tunnel portion 242, the electrical wiring 84 extends in the front-rear direction of the vehicle body across the right second floor cross member 45 and the left second floor cross member 45.

Furthermore, as shown in FIGS. 8 and 10, the lower cross member 93 of the battery pack 20 is fixed to the first to fourth floor longitudinal frames 55 to 58 in the up-down direction via the floor panel 23. That is, the battery pack 20 is fixed to the vehicle body 10 in the up-down direction by using the first to fourth floor longitudinal frames 55 to 58.

The first to fourth floor longitudinal frames 55 to 58 are frames extending in the front-rear direction of the vehicle body (see also FIG. 1). Thus, as shown in FIG. 2, when the layout of the battery pack 20 is decided, the battery pack 20 can be moved in, for example, the front-rear direction of the vehicle body to some extent.

Thereby, the position of the lower cross member 93 of the battery pack 20 can be selected relatively freely in the front-rear direction of the vehicle body. Thereby, when the layout of the battery module 82 is decided without consideration of the lower cross member 93, the degree of freedom of the layout can be increased in the front-rear direction of the vehicle body. For example, the plurality of batteries 85 can be evenly arranged in the front-rear direction of the vehicle body of the lower cross member 93, and the battery pack 20 can be miniaturized.

In addition, as shown in FIGS. 2 and 8, the battery pack 20 is fixed to the first to fourth floor longitudinal frames 55 to 58 in the up-down direction. Thus, the battery pack 20 can be moved in the front-rear direction of the vehicle body to some extent. Thereby, a center of gravity of pack Gi of the battery pack 20 can be arranged at the rear of a center of gravity of vehicle Gb of the entire vehicle in the vehicle body. The center of gravity of vehicle Gb of the entire vehicle is a center of gravity including all of the vehicle body 10, the motor (not shown), the battery pack 20, and the like.

By arranging the center of gravity of pack Gi of the battery pack 20 at the rear of the center of gravity of vehicle Gb in the vehicle body, the side collision load F1 input to a side portion of the vehicle by a side collision can be changed to a rotational moment M1 centered on the center of gravity of vehicle Gb.

In this way, by changing the side collision load F1 to the rotational moment M1, for example, it is possible to eliminate the need for reinforcement of the vehicle body 10. Thereby, deformation of the battery pack 20 can be suppressed without increasing the weight of the vehicle body 10, for example, an impact on the battery pack 20 due to a side collision can be mitigated.

As described above, according to the vehicle Ve equipped with a battery pack according to the embodiment, the following operations and effects can be obtained.

As shown in FIGS. 4 and 6, the first battery accessory 831 is arranged inside the front tunnel portion 241 from below, and the second battery accessory 832 and the third battery accessory 833 are arranged inside the rear tunnel portion 243 from below. Thus, the first battery accessory 831, the second battery accessory 832, and the third battery accessory 833 (that is, the accessory unit 83) can be arranged above the battery module 82. Thereby, for example, it is not necessary to arrange the accessory unit 83 around the battery module 82, and the capacity of the battery module 82 can be sufficiently secured in a state that the battery pack 20 is miniaturized.

In addition, the first battery accessory 831 is arranged in the front tunnel portion 241, and the second battery accessory 832 and the third battery accessory 833 are arranged in the rear tunnel portion 243, separately. Furthermore, the separated first battery accessory 831, second battery accessory 832, and third battery accessory 833 are connected by the electrical wiring 84. The electrical wiring 84 is arranged inside the central tunnel portion 242 from below.

Here, the front tunnel portion 241 and the rear tunnel portion are formed in a manner of being separated in the front-rear direction of the vehicle body with respect to the right second floor cross member 45 and the left second floor cross member 45 (that is, the central tunnel portion 242). FIG. 1 is referred to for the left second floor cross member 45. That is, the electrical wiring 84 is arranged at a position straddling the right second floor cross member 45 and the left second floor cross member 45 in the front-rear direction of the vehicle body. Furthermore, the first battery accessory 831, the second battery accessory 832, and the third battery accessory 833 can be arranged away from the right second floor cross member 45 and the left second floor cross member 45 in the front-rear direction of the vehicle body.

Thus, as shown in FIGS. 3 and 4, in the floor tunnel 24, only the central tunnel portion 242 can be kept lower than the other portions (that is, the front tunnel portion and the rear tunnel portion 243). The central tunnel portion 242 is a portion corresponding to the right second floor cross member 45 and the left second floor cross member 45. Thereby, as described above, the right second floor cross member 45 and the left second floor cross member 45 are formed into a state of being integrally continuous in the vehicle width direction via the top portion 242a of the central tunnel portion 242.

Thus, the rigidity and strength of the right second floor cross member 45 and the left second floor cross member 45 can be secured against the load F1 input from the side portion of the vehicle by a side collision. Thereby, the battery module 82 (that is, a plurality of batteries 85), the first battery accessory 831, the second battery accessory 832, the third battery accessory 833, and the like can be protected from the load f1 caused by a side collision.

Furthermore, as shown in FIGS. 4 and 5, the front tunnel portion 241 is raised higher than the rear tunnel portion 243. The first battery accessory 831, which is taller than the second battery accessory 832 and the third battery accessory 833, is arranged inside the front tunnel portion 241. In addition, the second battery accessory 832 and the third battery accessory 833, which are shorter than the first battery accessory 831, are arranged inside the rear tunnel portion 243.

Here, for example, by accommodating the front tunnel portion 241 inside the center console between the right front seat FS1 and the left front seat FS2 (for example, a driver seat and a passenger seat), the tall first battery accessory 831 can be accommodated inside the center console.

In addition, for example, by arranging the rear tunnel portion 243 on the vehicle body front side of the rear seat RS, the height of the floor tunnel 24 (that is, the rear tunnel portion 243) can be kept low in the vehicle body front of the rear seat RS. In this way, by separately arranged the tall first battery accessory 831, the short second battery accessory 832, and the short third battery accessory 833 inside the floor tunnel 24 in the front-rear direction of the vehicle body, an interior space of the vehicle Ve can be widened.

In addition, the front portion (front leg) and the rear portion (rear leg) of the right front seat FS1 are respectively fixed to the right first floor cross member 44 and the right second floor cross member 45. The front portion (front leg) and the rear portion (rear leg) of the left front seat FS2 are respectively fixed to the left first floor cross member 44 and the left second floor cross member 45.

In addition, the front portion (front leg) of the rear seat RS is fixed to the right third floor cross member 46 and the left third floor cross member 46.

Furthermore, the battery pack 20 is fixed to the vehicle body 10 using the first to fourth floor longitudinal frames 55 to 58.

Thus, for example, the mounting bolt 146 or the like for fixing the battery pack 20 to the vehicle body 10 using the first to fourth floor longitudinal frames 55 to 58 can be arranged in a space between the right and left front seats FS1 and FS2 and the rear seat RS. That is, a tool can be easily accessed to the mounting bolt 146 or the like, and it is not necessary to remove the right and left front seats FS1 and FS2 and the rear seat RS when the battery pack 20 is attached or detached. Thus, for example, when the battery pack 20 is assembled, it is possible to reduce restrictions on the assembling order and furthermore shorten working time. Thereby, for example, detachability of the battery pack 20 can be improved, and maintenance (maintenance and inspection) cost can be kept low.

Particularly, the second battery accessory 832 is arranged at a portion 243*a* on the vehicle body front side in the rear tunnel portion 243 of the floor tunnel 24. The portion 243*a* on the vehicle body front side of the rear tunnel portion 243 is arranged in, for example, the space between the right and left front seats FS1 and FS2 and the rear seat RS in the front-rear direction of the vehicle body. Thus, the second battery accessory 832 is used as a cutoff switch and is accommodated in the portion 243*a* on the vehicle body front side of the rear tunnel portion 243. Thereby, the second battery accessory 832 (that is, the cutoff switch) can be arranged in the space between the right and left front seats FS1 and FS2 and the rear seat RS. Accordingly, for example, because the cutoff switch can be operated without moving the right and left front seats FS1 and FS2 and the rear seat RS, maintenance work (maintenance and inspection work) of the battery pack 20 can be facilitated.

Figure 12:
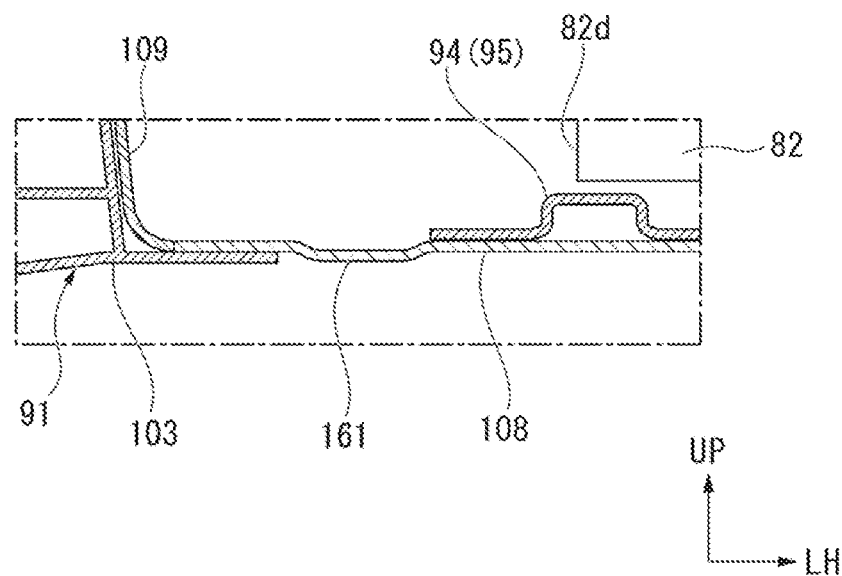
FIG. 12 is an enlarged cross-sectional view of portion XII in FIG. 3.

As shown in FIGS. 3 and 12, the first right first longitudinal frame 94 and the first right second longitudinal frame 95 (see also FIG. 7) are extended toward the front-rear direction of the vehicle body at a right outer end portion 82*d* of the battery module 82 in the vehicle width direction. The first right first longitudinal frame 94 and the first right second longitudinal frame 95 support the right outer end portion 82*d* of the battery module 82 in the vehicle width direction.

On the case bottom 108 of the battery case 81, the easily deformable portion (tray deforming portion (region)) 161 is arranged further outward in the vehicle width direction than the first right first longitudinal frame (outer longitudinal frame) 94 and the first right second longitudinal frame (outer longitudinal frame) 95.

Specifically, the easily deformable portion 161 is arranged between the right frame 103 and the battery module 82.

The easily deformable portion 161 is formed in a bead shape in a manner of protruding downward, and extends in the front-rear direction of the vehicle body. The easily deformable portion 161 is formed to be deformed by the side collision load F1 of a side collision so as to be capable of absorbing a side collision energy (impact energy).

Figure 13:
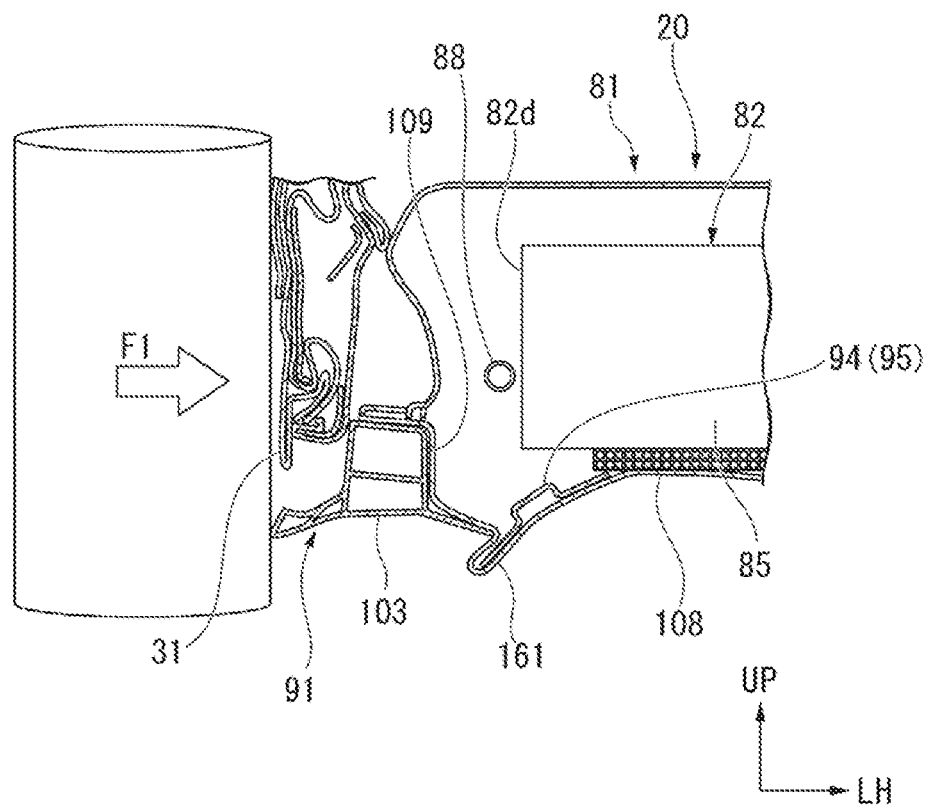
FIG. 13 is a cross-sectional view illustrating an example of deforming an easily deformable portion of the battery pack of an embodiment.

Thus, as shown in FIG. 13, the easily deformable portion 161 can be deformed by the side collision load F1 input by a side collision, and the side collision energy can be absorbed by the easily deformable portion 161. Thereby, interference with the battery module 82 caused by the load F1 of a side collision can be reduced.

Furthermore, for example, it is possible to eliminate the need for reinforcement of a vehicle body frame (framework member) such as the right side sill 31 arranged on the outer side of the vehicle body 10 in the vehicle width direction. Thereby, a yield strength of the vehicle body can be kept low and the weight of the vehicle body can be reduced.

Here, as shown in FIGS. 12 and 13, the easily deformable portion 161 is formed in a bead shape in a manner of protruding downward. Thus, the easily deformable portion 161 can be deformed downward. Thereby, for example, interference of the easily deformable portion 161 with the battery module 82 (that is, the plurality of batteries 85) accommodated inside the battery case 81 of the battery pack 20, the water cooling pipe 88, or the like can be avoided.

In addition, on the left side of the case bottom 108 of the battery case 81, as on the right side, an easily deformable portion (not shown) is arranged further outward in the vehicle width direction than the first left first longitudinal frame (outer longitudinal frame) 94 and the first left second longitudinal frame (outer longitudinal frame) 95. That is, the easily deformable portion 161 is arranged between the left frame 104 and the battery module 82.

Thus, the easily deformable portion can be deformed downward by the side collision load input by a side collision. Thereby, the side collision energy can be absorbed by the easily deformable portion, which can eliminate the need for reinforcement of the vehicle body frame (framework member) such as the left side sill 31 or the like, and reduce the weight of the vehicle body frame.

Furthermore, by deforming the easily deformable portion downward, the interference of the easily deformable portion 161 with the battery module 82 (that is, the plurality of batteries 85), the water cooling pipe 88, or the like can be avoided.

Additionally, as described in FIGS. 1 and 3, by arranging the inclined member 48 below the right end portion 45*a* of the right second floor cross member 45, the inclined closed cross section 49 is formed larger than the cross member inclined closed cross section 47. Therefore, for example, the inclined member 48 can be deformed in a manner of being bent downward with respect to the right second floor cross member 45 under the side collision load F1 input by a side collision. Accordingly, the side collision energy generated by the side collision can be absorbed by the inclined member 48.

Similar to the right second floor cross member 45, each of the left second floor cross member 45, the right third floor cross member 46, and the left third floor cross member 46 is also provided with an inclined member 48 below. Therefore, for example, the inclined member 48 can be deformed in a manner of being bent downward with respect to the left second floor cross member 45, the right third floor cross member 46, and the left third floor cross member 46 under the side collision load F1 input by a side collision. Accordingly, the side collision energy generated by the side collision can be absorbed by the inclined member 48.

It should be noted that the technical scope of the disclosure is not limited to the above embodiment, and various modifications can be made without departing from the spirit of the disclosure.

In addition, it is possible to replace component elements in the above embodiment with well-known component elements as appropriate without departing from the spirit of the disclosure, and the modifications described above may be appropriately combined.

According to this configuration, the first battery accessory is arranged inside the front tunnel portion from below, and the second battery accessory is arranged inside the rear tunnel portion from below. Thus, the first battery accessory and the second battery accessory can be arranged above the battery module. Thereby, for example, it is not necessary to arrange the first battery accessory and the second battery accessory around the battery module, a battery capacity can be sufficiently secured in a state that the battery pack is miniaturized, and a space that allows impact deformation can be formed between a side sill and a battery in the vehicle width direction to reduce the reinforcement of the side sill and reduce the weight.

In addition, the first battery accessory and the second battery accessory are separately arranged in the front tunnel portion and the rear tunnel portion. Furthermore, the separated first battery accessory and second battery accessory are connected by the high-voltage electric wire. Here, the front tunnel portion and the rear tunnel portion are formed separately in the front-rear direction of the vehicle body of the floor cross member. That is, in the front-rear direction of the vehicle body, the high-voltage electric wire can be arranged at a position straddling the floor cross member, and the first battery accessory and the second battery accessory can be arranged apart from the floor cross member. Thus, in the floor tunnel, only a portion corresponding to the floor cross member can be kept lower than the other portions. Thereby, the rigidity and strength of the floor cross member can be secured against a load input from the vehicle side by a side collision, and the battery, the first battery accessory, the second battery accessory, and the like can be protected from the load caused by the side collision.

Furthermore, the front tunnel portion is raised higher than the rear tunnel portion, and the first battery accessory, which is higher than the second battery accessory, is arranged inside the front tunnel portion. In addition, the second battery accessory, which is lower than the first battery accessory, is arranged inside the rear tunnel portion. Hereinafter, the first battery accessory that is higher than the second battery accessory may be referred to as "tall first battery accessory", and the second battery accessory that is lower than the first battery accessory may be referred to as "short second battery accessory". The tall first battery accessory may be, for example, a high-voltage junction board, and the short second battery accessory may be, for example, a cutoff switch and an electric control unit (ECU).

Here, for example, by accommodating the front tunnel portion inside a center console between left and right seats of front seats (specifically, between a driver seat and a passenger seat), the tall first battery accessory can be accommodated inside the center console. In addition, for example, by arranging the rear tunnel portion on a central portion in front of a rear seat, a height of the floor tunnel can be kept low in the central portion in front of the rear seat, and a foot space of an occupant at the rear seat can be expanded. In this way, by separately arranging the tall first battery accessory and the short second battery accessory inside the floor tunnel, an interior space of the vehicle can be widened.

The vehicle equipped with a battery pack may include a floor longitudinal frame (for example, first to fourth floor longitudinal frames 55 to 58 in the embodiment) that intersects the floor cross member and extends in the front-rear direction of the vehicle body and is raised upward from the floor panel, and the battery pack may include a tray cross member (for example, a lower cross member 93 in the embodiment) arranged at the bottom (for example, a case bottom 108 in the embodiment) of a tray (for example, a case bottom 92 in the embodiment) of the battery pack and fixed to the floor longitudinal frame.

According to this configuration, the floor longitudinal frame extending in the front-rear direction of the vehicle body is arranged on the floor panel, and the tray cross member of the battery pack is fixed to the floor longitudinal frame. That is, the battery pack can be fixed to the vehicle body by using the floor longitudinal frame extending in the front-rear direction of the vehicle body. Thus, a position of the tray cross member can be selected relatively freely in the front-rear direction of the vehicle body. Thereby, when the layout of the battery module is decided without consideration of the tray cross member, the degree of freedom of the layout in the front-rear direction of the vehicle body can be increased. For example, the batteries can be evenly arranged in the front-rear direction of the vehicle body of the tray cross member, and the battery pack can be miniaturized.

A pair of the floor cross members may be arranged on both sides of the floor tunnel in the vehicle width direction. The inside of the floor tunnel may include a first reinforcing material (for example, a first reinforcing material 245 in the embodiment) connected to the pair of floor cross members, and a second reinforcing material (for example, a second reinforcing material 246 in the embodiment) connected to the floor panel. The first reinforcing material and the second reinforcing material may be formed in an X-shape in a front view.

According to this configuration, the first reinforcing material and the second reinforcing material are arranged in an X-shape inside a portion (hereinafter, also referred to as central tunnel portion) of the floor tunnel corresponding to the pair of floor cross members. Thus, the rigidity and strength of the first reinforcing material and the second reinforcing material can be secured inside the central tunnel portion. In addition, the first reinforcing material is connected to the pair of floor cross members arranged on both sides of the floor tunnel. Furthermore, the second reinforcing material is connected to the pair of floor panels arranged on both sides of the floor tunnel.

Here, the first reinforcing material and the second reinforcing material are arranged in an X-shape. Thus, for example, the load input through the floor cross member by a side collision can be supported by the first reinforcing material and the second reinforcing material. Thereby, for example, it is not necessary to increase a plate thickness of the first reinforcing material and the second reinforcing material to reinforce the floor tunnel, and a yield strength of the first reinforcing material and the second reinforcing material can be kept low to reduce the weight.

The battery pack may include a center frame (for example, an upper deck 97 in the embodiment) arranged above the battery module and extending in the front-rear direction of the vehicle body at the center of the battery module in the vehicle width direction. The battery module may include: a first battery row (for example, a first battery row 128 in the embodiment) which is arranged in the vehicle body front of the tray cross member, and in which a plurality of batteries (for example, a battery 85 in the embodiment) having a longitudinal direction directed toward the front-rear direction of the vehicle body are arranged along the tray cross member in the vehicle width direction; and a second battery row (for example, a second battery row 129 in the embodiment) which is arranged at the vehicle body rear of the tray cross member, and in which a plurality of batteries having a longitudinal direction directed toward the front-rear direction of the vehicle body are arranged along the tray cross member in the vehicle width direction. In the high-voltage electric wire, battery terminals of the first battery row and a plurality of battery terminals of the second battery row may be horizontally wired along the tray cross member in the vehicle width direction, and may be vertically wired to a drive motor side in a state of being bundled along an upper surface of the center frame.

According to this configuration, the battery terminals of the first battery row and the plurality of battery terminals of the second battery row are horizontally wired (routed) in the vehicle width direction along the tray cross member by the high-voltage electric wire. Furthermore, the horizontally wired high-voltage electric wire is vertically wired (routed)

to the drive motor side in a state of being bundled along the upper surface of the center frame.

Accordingly, by supporting the load input by a side collision with the tray cross member, the high-voltage electric wire horizontally wired in the vehicle width direction along the tray cross member can be protected from the input load by the tray cross member. In addition, the high-voltage electric wire vertically wired to the drive motor side in a state of being bundled along the upper surface of the center frame is arranged at a position relatively distant from the load input by a side collision in the vehicle width direction. Thereby, the vertically wired high-voltage electric wire can be protected from the input load.

Furthermore, the horizontally wired high-voltage electric wire and the vertically wired high-voltage electric wire are, for example, wired (routed) in a T-shape or a cross shape. Thereby, for example, the tall battery accessory and the short battery accessory can be arranged on a line of the high-voltage electric wire, and the high-voltage electric wire can be shortened.

The battery pack may include a water cooling pipe (for example, a water cooling pipe 88 in the embodiment) arranged on an outer peripheral (for example, an outer peripheral 82c in the embodiment) side of the battery module and along an inner wall surface (for example, a case peripheral wall 109 in the embodiment) of the tray.

According to this configuration, the water cooling pipe is arranged on the outer peripheral side of the battery module and along the inner wall surface of the tray. Here, for example, by wiring the high-voltage electric wire in a T-shape or a cross shape, the high-voltage electric wire can be arranged away from the outer peripheral side of the battery module. Thereby, the water cooling pipe can be separated from the high-voltage electric wire, and a water-impact prevention cover for preventing the high-voltage electric wire from being exposed to water can be eliminated.

The vehicle equipped with a battery pack may include another floor cross member (for example, a third floor cross member 46 in the embodiment) that extends in the vehicle width direction along the floor cross member at the vehicle body rear of the floor cross member and is connected to the floor cross member via the floor longitudinal frame. A rear portion of a front seat (for example, right and left front seats FS1 and FS2 in the embodiment) may be fixed to the floor cross member, a front portion of a rear seat (for example, a rear seat RS in the embodiment) may be fixed to the another floor cross member, and the battery pack may be fixed to the floor longitudinal frame.

According to this configuration, another floor cross member is arranged at the vehicle body rear of the floor cross member, and the floor cross member and the another floor cross member are connected by the floor longitudinal frame. In addition, the rear portion (rear leg) of the front seat is fixed to the floor cross member, and the front portion (front leg) of the rear seat is fixed to the another floor cross member. Furthermore, the battery pack is fixed to the floor longitudinal frame.

Thus, for example, a mounting bolt or the like for fixing the battery pack to the floor longitudinal frame can be arranged in a space between the front seat and the rear seat. That is, a tool can be easily accessed to the mounting bolt or the like, and it is not necessary to remove the front seat and the rear seat when the battery pack is attached or detached. Thus, for example, when the battery pack is assembled, it is possible to reduce restrictions on the assembling order and furthermore shorten working time. Thereby, for example, detachability of the battery pack can be improved, and maintenance (maintenance and inspection) cost can be kept low.

The vehicle equipped with a battery pack may include: side sills (for example, right and left side sills 31 in the embodiment) arranged on both sides of the battery pack in the vehicle width direction and extending in the front-rear direction of the vehicle body; a front side frame (right and left front side frames 36 in the embodiment) that extends from the side sill to the front of the vehicle body; a branch portion (right and left branch portions 38 in the embodiment) extending from a rear end portion (for example, a bent portion 36a in the embodiment) of the front side frame toward the rear of the vehicle body; and a rear cross member (for example, a rear cross member 138 in the embodiment) arranged at the rear of the vehicle body from the battery pack and extending in the vehicle width direction. The battery pack may include: a front portion (for example, a front frame 101 in the embodiment) fixed to the branch portion; a rear portion (for example, a rear frame 102 in the embodiment) fixed to the rear cross member; a right side portion (for example, a right frame 103 in the embodiment) and a left side portion (for example, a left frame 104 in the embodiment) fixed to the side sill; and a central portion (for example, a lower cross member 93 in the embodiment) in the front-rear direction of the vehicle body fixed to the floor longitudinal frame.

According to this configuration, the front portion of the battery pack is fixed to the branch portion. The branch portion extends from the rear end portion of the front side frame to the front of the vehicle body. In addition, the rear portion of the battery pack is fixed to the rear cross member, and the right side portion and the left side portion of the battery pack are fixed to the side sill. Furthermore, the central portion of the battery pack is fixed to the floor longitudinal frame. Thereby, a large accommodation space for the battery module can be secured inside the battery pack to maximize the battery capacity of the battery pack, and furthermore the battery pack can be stably fixed under the floor panel.

Furthermore, the central portion of the battery pack is fixed to the floor longitudinal frame. The floor longitudinal frame is a frame that extends in the front-rear direction of the vehicle body. Thus, when the layout of the battery pack is decided, for example, the battery pack can be moved in the front-rear direction of the vehicle body to some extent. That is, a center of gravity of pack of the battery pack can be arranged at the rear of a center of gravity of vehicle of the entire vehicle in the vehicle body. Thereby, for example, the load input to the battery pack by a side collision can be changed to a rotational moment, and an impact on the battery pack due to a side collision can be mitigated.

The first battery accessory may be a high-voltage junction board, and the second battery accessory may be a cutoff switch.

Here, the second battery accessory is arranged on the rear tunnel portion of the floor tunnel. The rear tunnel portion is arranged in, for example, the space between the front seat and the rear seat. Therefore, in this configuration, the second battery accessory is used as a cutoff switch. Thus, the cutoff switch can be arranged in the space between the front seat and the rear seat. Thereby, for example, because the cutoff switch can be operated without moving the front seat or the rear seat, a maintenance work (maintenance and inspection work) of the battery pack becomes easy.

The tray may include a side frame (for example, a right frame 103 and a left frame 104 in the embodiment) forming the left side portion and the right side portion fixed to the side sill, and a tray deforming portion (for example, an easily deformable portion 161 in the embodiment) arranged between the side frame and the battery module and capable of absorbing impact energy by being deformed by a load of a side collision.

According to this configuration, the tray deforming portion is arranged between the side frame fixed to the side sill and the battery module. Furthermore, the impact energy can be absorbed by deforming the tray deforming portion by the load of a side collision. Thereby, it is possible to reduce the interference with the battery module due to the load of a side collision.

Furthermore, for example, it is possible to eliminate the need for reinforcement of a vehicle body frame (framework member) such as the side sill arranged on the outer side of the vehicle body in the vehicle width direction. Thereby, a yield strength of the vehicle body can be kept low and the weight of the vehicle body can be reduced.

An end portion (for example, a right end portion 45*a*, a cross member right end portion 45*a*, a left end portion 45*c*, a cross member left end portion 45*c*, a right end portion 46*a*, a cross member right end portion 46*a*, a left end portion 46*c*, a cross member left end portion 46*c* in the embodiment) of the floor cross member may be inclined downward toward the outer side in the vehicle width direction to the side sill. The vehicle equipped with a battery pack may include an inclined member (for example, an inclined member 48 in the embodiment) arranged below the floor panel in a manner of sandwiching the floor panel together with the end portion of the floor cross member. The inclined member may form a closed cross section (for example, an inclined closed cross section 49 in the embodiment) to the side sill together with the floor panel.

According to this configuration, the end portion of the floor cross member is inclined downward toward the outer side in the vehicle width direction to the side sill. Furthermore, the inclined member is arranged below the floor panel, and the inclined member and the floor panel form a closed cross section extending to the side sill. Thus, a portion of the floor panel in the vicinity of the side sill can be reinforced by the floor cross member and the inclined member.

The reason for reinforcing the portion of the floor panel in the vicinity of the side sill is as follows. That is, for example, in order to increase a height of the battery pack in an up-down direction and furthermore to facilitate the getting on and off of the occupant, it is preferable to join the floor panel along an upper end of the side sill. However, when the floor panel is joined along the upper end of the side sill, it is difficult to secure the rigidity and strength of the portion in the vicinity of the side sill against a side collision load input by a side collision.

Thus, the portion of the floor panel in the vicinity of the side sill is reinforced by the floor cross member and the inclined member to secure the rigidity and strength.

Thereby, for example, even if the floor panel is formed along the upper end of the side sill in order to increase the height of the battery pack in the up-down direction and furthermore to facilitate the getting on and off of the occupant, the load input by a side collision can be supported by the floor cross member and the inclined member.

The closed cross section formed by the inclined member and the floor panel may be larger than a closed cross section (for example, a cross member inclined closed cross section 47 in the embodiment) formed by the end portion of the floor cross member and the floor panel.

According to this configuration, a closed cross section of the inclined member is made larger than a closed cross section of the floor cross member. Thus, the inclined member can be deformed in a manner of being bent downward with respect to the floor cross member by the load input by a side collision. Thereby, the side collision energy (impact energy) due to a side collision can be absorbed by the inclined member.

According to the disclosure, the battery capacity can be sufficiently secured, and furthermore, the battery, the battery accessory, and the like can be protected from the load input by a side collision.

What is claimed is:

1. A vehicle equipped with a battery pack, comprising:
   a floor cross member that is raised upward from a floor panel forming a floor portion of a vehicle and extends in a vehicle width direction;
   a floor tunnel which intersects the floor cross member and extends in a front-rear direction of a vehicle body, and in which a front tunnel portion in front of the floor cross member in the vehicle body is raised higher than a rear tunnel portion at the rear of the floor cross member in the vehicle body from the floor panel; and
   a battery pack comprising a battery module, which is arranged below the floor panel and below the floor cross member and the floor tunnel;
   wherein the battery pack comprises:
   a first battery accessory arranged inside the front tunnel portion from below;
   a second battery accessory arranged inside the rear tunnel portion from below; and
   a high-voltage electric wire that extends in the front-rear direction of the vehicle body across the floor cross member inside the floor tunnel, and connects the first battery accessory and the second battery accessory; and
   wherein the first battery accessory is formed higher than the second battery accessory.

2. The vehicle equipped with a battery pack according to claim 1, comprising
   a floor longitudinal frame that intersects the floor cross member and extends in the front-rear direction of the vehicle body and is raised upward from the floor panel;
   wherein the battery pack comprises
   a tray cross member arranged at the bottom of a tray of the battery pack and fixed to the floor longitudinal frame.

3. The vehicle equipped with a battery pack according to claim 1, wherein
   a pair of the floor cross members is arranged on both sides of the floor tunnel in the vehicle width direction;
   the inside of the floor tunnel comprises:
   a first reinforcing material connected to the pair of floor cross members; and
   a second reinforcing material connected to the floor panel; and
   the first reinforcing material and the second reinforcing material are formed in an X-shape in a front view.

4. The vehicle equipped with a battery pack according to claim 2, wherein
   a pair of the floor cross members is arranged on both sides of the floor tunnel in the vehicle width direction;
   the inside of the floor tunnel comprises:
   a first reinforcing material connected to the pair of floor cross members; and
   a second reinforcing material connected to the floor panel; and
   the first reinforcing material and the second reinforcing material are formed in an X-shape in a front view.

5. The vehicle equipped with a battery pack according to claim 2, wherein the battery pack comprises
a center frame arranged above the battery module and extending in the front-rear direction of the vehicle body at the center of the battery module in the vehicle width direction;
the battery module comprises
a first battery row which is arranged in the vehicle body front of the tray cross member, and in which a plurality of batteries having a longitudinal direction directed toward the front-rear direction of the vehicle body are arranged along the tray cross member in the vehicle width direction; and
a second battery row which is arranged at the vehicle body rear of the tray cross member, and in which a plurality of batteries having a longitudinal direction directed toward the front-rear direction of the vehicle body are arranged along the tray cross member in the vehicle width direction;
in the high-voltage electric wire,
battery terminals of the first battery row and a plurality of battery terminals of the second battery row are horizontally wired along the tray cross member in the vehicle width direction, and are vertically wired to a drive motor side in a state of being bundled along an upper surface of the center frame.

6. The vehicle equipped with a battery pack according to claim 5, wherein the battery pack comprises
a water cooling pipe arranged on an outer peripheral side of the battery module and along an inner wall surface of the tray.

7. The vehicle equipped with a battery pack according to claim 2, comprising another floor cross member that extends in the vehicle width direction along the floor cross member at the vehicle body rear of the floor cross member and is connected to the floor cross member via the floor longitudinal frame;
wherein a rear portion of a front seat is fixed to the floor cross member;
a front portion of a rear seat is fixed to the another floor cross member; and
the battery pack is fixed to the floor longitudinal frame.

8. The vehicle equipped with a battery pack according to claim 2, comprising:

side sills arranged on both sides of the battery pack in the vehicle width direction and extending in the front-rear direction of the vehicle body;
a front side frame that extends from the side sill to the front of the vehicle body;
a branch portion extending from a rear end portion of the front side frame toward the rear of the vehicle body; and
a rear cross member arranged at the rear of the battery pack in the vehicle body and extending in the vehicle width direction;
wherein the battery pack comprises:
a front portion fixed to the branch portion;
a rear portion fixed to the rear cross member;
a right side portion and a left side portion fixed to the side sill; and
a central portion in the front-rear direction of the vehicle body fixed to the floor longitudinal frame.

9. The vehicle equipped with a battery pack according to claim 5, comprising:

side sills arranged on both sides of the battery pack in the vehicle width direction and extending in the front-rear direction of the vehicle body;
a front side frame that extends from the side sill to the front of the vehicle body;
a branch portion extending from a rear end portion of the front side frame toward the rear of the vehicle body; and
a rear cross member arranged at the rear of the battery pack in the vehicle body and extending in the vehicle width direction;
wherein the battery pack comprises:
a front portion fixed to the branch portion;
a rear portion fixed to the rear cross member;
a right side portion and a left side portion fixed to the side sill; and
a central portion in the front-rear direction of the vehicle body fixed to the floor longitudinal frame.

10. The vehicle equipped with a battery pack according to claim 6, comprising:

side sills arranged on both sides of the battery pack in the vehicle width direction and extending in the front-rear direction of the vehicle body;
a front side frame that extends from the side sill to the front of the vehicle body;
a branch portion extending from a rear end portion of the front side frame toward the rear of the vehicle body; and
a rear cross member arranged at the rear of the battery pack in the vehicle body and extending in the vehicle width direction;
wherein the battery pack comprises:
a front portion fixed to the branch portion;
a rear portion fixed to the rear cross member;
a right side portion and a left side portion fixed to the side sill; and
a central portion in the front-rear direction of the vehicle body fixed to the floor longitudinal frame.

11. The vehicle equipped with a battery pack according to claim 7, comprising:

side sills arranged on both sides of the battery pack in the vehicle width direction and extending in the front-rear direction of the vehicle body;
a front side frame that extends from the side sill to the front of the vehicle body;
a branch portion extending from a rear end portion of the front side frame toward the rear of the vehicle body; and
a rear cross member arranged at the rear of the battery pack in the vehicle body and extending in the vehicle width direction;
wherein the battery pack comprises:
a front portion fixed to the branch portion;
a rear portion fixed to the rear cross member;
a right side portion and a left side portion fixed to the side sill; and
a central portion in the front-rear direction of the vehicle body fixed to the floor longitudinal frame.

12. The vehicle equipped with a battery pack according to claim 1, wherein the first battery accessory is a high-voltage junction board; and
the second battery accessory is a cutoff switch.

13. The vehicle equipped with a battery pack according to claim 2, wherein the first battery accessory is a high-voltage junction board; and
the second battery accessory is a cutoff switch.

14. The vehicle equipped with a battery pack according to claim 3, wherein
the first battery accessory is a high-voltage junction board; and
the second battery accessory is a cutoff switch.

15. The vehicle equipped with a battery pack according to claim 5, wherein
the first battery accessory is a high-voltage junction board; and
the second battery accessory is a cutoff switch.

16. The vehicle equipped with a battery pack according to claim 6, wherein
the first battery accessory is a high-voltage junction board; and
the second battery accessory is a cutoff switch.

17. The vehicle equipped with a battery pack according to claim 7, wherein
the first battery accessory is a high-voltage junction board; and
the second battery accessory is a cutoff switch.

18. The vehicle equipped with a battery pack according to claim 8, wherein the tray comprises:
a side frame forming the left side portion and the right side portion fixed to the side sill; and
a tray deforming portion arranged between the side frame and the battery module and capable of absorbing impact energy by being deformed by a load of a side collision.

19. The vehicle equipped with a battery pack according to claim 8, wherein
an end portion of the floor cross member is inclined downward toward the outer side in the vehicle width direction to the side sill;
the vehicle equipped with a battery pack comprises an inclined member arranged below the floor panel in a manner of sandwiching the floor panel together with the end portion of the floor cross member; and
the inclined member forms a closed cross section to the side sill together with the floor panel.

20. The vehicle equipped with a battery pack according to claim 19, wherein
the closed cross section formed by the inclined member and the floor panel is larger than a closed cross section formed by the end portion of the floor cross member and the floor panel.

* * * * *